United States Patent
Terada et al.

(10) Patent No.: US 10,016,023 B2
(45) Date of Patent: Jul. 10, 2018

(54) METHOD FOR MANUFACTURING MOLDING HOOK AND LOOP FASTENER

(71) Applicant: YKK Corporation, Tokyo (JP)

(72) Inventors: Mineto Terada, Toyama (JP); Shinichi Imai, Toyama (JP); Hiromasa Abe, Toyama (JP)

(73) Assignee: YKK Corporation (JP)

( * ) Notice: Subject to any disclaimer, the term of this patent is extended or adjusted under 35 U.S.C. 154(b) by 13 days.

(21) Appl. No.: 14/878,248

(22) Filed: Oct. 8, 2015

(65) Prior Publication Data

US 2016/0023386 A1   Jan. 28, 2016

Related U.S. Application Data

(62) Division of application No. 13/818,661, filed as application No. PCT/JP2010/064196 on Aug. 23, 2010, now Pat. No. 9,271,546.

(51) Int. Cl.
*A44B 18/00* (2006.01)
*B29C 47/32* (2006.01)
(Continued)

(52) U.S. Cl.
CPC ...... *A44B 18/0069* (2013.01); *A44B 18/0065* (2013.01); *A44B 18/0076* (2013.01);
(Continued)

(58) Field of Classification Search
CPC ............ A44B 18/0069; A44B 18/0065; A44B 18/0076; B29C 43/28; B29C 43/222;
(Continued)

(56) References Cited

U.S. PATENT DOCUMENTS 4,842,916 A    6/1989  Ogawa et al.
5,606,781 A *  3/1997  Provost .............. A44B 18/0076
                                                   24/306
(Continued)

FOREIGN PATENT DOCUMENTS

JP    2005-211198 A    8/2005
JP    2006-341597 A   12/2006
(Continued)

OTHER PUBLICATIONS

International Search Report, PCT Application No. PCT/JP2010/064196, dated Oct. 26, 2010.
(Continued)

*Primary Examiner* — Jeffrey Wollschlager
(74) *Attorney, Agent, or Firm* — Kilpatrick Townsend & Stockton LLP

(57) ABSTRACT

Provided is a molding hook and loop fastener, in which a barrier erected near left and right side edges of a substrate includes at least two rows of vertical wall arrays, and the vertical wall array includes a plurality of vertical walls disposed alternately. Between the two adjacent, rows of the vertical walls disposed alternately, each of the vertical walls disposed on one row is connected to two vertical walls disposed on the other row via a connecting part, and the connecting part connects one end portion of one vertical wall disposed on the adjacent row and the other end portion of the other vertical wall. Due to this, in the molding hook and loop fastener an outer side and an inner side of the barrier can be divided by the vertical wall array and the connecting part, and flexibility of the molding hook and loop fastener can be improved.

17 Claims, 10 Drawing Sheets

(51) Int. Cl.
  *B29C 43/28* (2006.01)
  *B29C 43/22* (2006.01)
  *B29C 47/00* (2006.01)
  *B29L 31/00* (2006.01)
  *B29K 101/12* (2006.01)

(52) U.S. Cl.
  CPC ............ *B29C 43/222* (2013.01); *B29C 43/28* (2013.01); *B29C 47/32* (2013.01); *B29C 47/0059* (2013.01); *B29K 2101/12* (2013.01); *B29L 2031/729* (2013.01); *Y10T 24/27* (2015.01); *Y10T 24/2717* (2015.01); *Y10T 24/2775* (2015.01)

(58) Field of Classification Search
  CPC . B29C 47/32; B29C 47/0059; B29K 2101/12; Y10T 24/2717; Y10T 24/27; Y10T 24/2775; B29L 2031/729
  See application file for complete search history.

(56) References Cited

U.S. PATENT DOCUMENTS

| | | | | |
|---|---|---|---|---|
| 5,690,875 | A * | 11/1997 | Sakakibara | A44B 18/0049 264/146 |
| 5,755,015 | A * | 5/1998 | Akeno | A44B 18/0049 24/442 |
| 5,781,969 | A * | 7/1998 | Akeno | A44B 18/0065 24/442 |
| 5,868,987 | A * | 2/1999 | Kampfer | A44B 18/0061 24/442 |
| 5,933,927 | A * | 8/1999 | Miller | A44B 18/0049 24/452 |
| 5,953,797 | A * | 9/1999 | Provost | A44B 18/0049 24/304 |
| 6,039,911 | A * | 3/2000 | Miller | A44B 18/0049 264/167 |
| 6,280,670 | B1 * | 8/2001 | Buzzell | A44B 18/0049 264/146 |
| 6,627,133 | B1 * | 9/2003 | Tuma | A44B 18/0049 264/167 |
| 6,656,563 | B1 | 12/2003 | Leach et al. | |
| 6,720,059 | B2 | 4/2004 | Fujisawa et al. | |
| 7,172,008 | B2 * | 2/2007 | Vanbenschoten | A44B 18/0049 156/244.22 |
| 7,217,119 | B2 * | 5/2007 | Clune | B29C 33/301 425/363 |
| 7,431,976 | B2 * | 10/2008 | Hermann | A44B 18/0076 24/442 |
| 7,785,095 | B2 * | 8/2010 | Clune | A44B 18/0049 425/122 |
| 7,998,548 | B2 | 8/2011 | Murasaki et al. | |
| 8,512,845 | B2 * | 8/2013 | Terada | A44B 18/0049 428/100 |
| 8,756,770 | B2 | 6/2014 | Cina et al. | |
| 9,034,452 | B2 | 5/2015 | Cina et al. | |
| 2002/0023322 | A1 | 2/2002 | Murasaki | |
| 2002/0164449 | A1 | 11/2002 | Fujisawa et al. | |
| 2002/0164451 | A1 * | 11/2002 | Fujisawa | A44B 18/0046 428/100 |
| 2003/0214068 | A1 * | 11/2003 | Fujisawa | A44B 18/0049 264/145 |
| 2004/0088835 | A1 * | 5/2004 | Tachauer | A44B 18/0061 24/451 |
| 2005/0160534 | A1 * | 7/2005 | Akeno | A44B 18/0076 5/652 |
| 2006/0269635 | A1 | 11/2006 | Billarant | |
| 2010/0162535 | A1 | 7/2010 | Cheng | |
| 2011/0167598 | A1 | 7/2011 | Cheng | |
| 2011/0197404 | A1 | 8/2011 | Terada et al. | |
| 2013/0149490 | A1 | 6/2013 | Cina et al. | |
| 2013/0340214 | A1 | 12/2013 | Terada et al. | |
| 2014/0130311 | A1 | 5/2014 | Okuda et al. | |
| 2014/0298628 | A1 | 10/2014 | Minato et al. | |

FOREIGN PATENT DOCUMENTS

| | | |
|---|---|---|
| JP | 3886965 B2 | 2/2007 |
| WO | 2010/016122 A1 | 2/2010 |
| WO | 2010/052779 A1 | 5/2010 |
| WO | WO2010052779 * | 5/2010 |

OTHER PUBLICATIONS

International Preliminary Report on Patentability, PCT Application No. PCT/JP2010/064196, dated Feb. 26, 2013.

* cited by examiner

METHOD FOR MANUFACTURING MOLDING HOOK AND LOOP FASTENER

This application is a divisional application of U.S. application Ser. No. 13/818,661, now U.S. Pat. No. 9,271,546, which is a national stage application of PCT/JP2010/064196, both of which are incorporated herein by reference.

TECHNICAL FIELD

The invention relates to a molding hook and loop fastener in which a plurality of engaging elements are disposed on one surface of a planar substrate portion and which is integrally molded to a foam body when the foam body is molded. More specifically, the invention relates to a molding hook and loop fastener capable of preventing a molding resin material from entering into an engaging element forming region of a substrate portion when a foam body is molded.

BACKGROUND ART

A cushion body is included in skin materials of passenger seats of automobiles or trains, various kinds of sofas, office chairs, and the like. As this cushion body, a molded body called rock wool, for example, which is obtained by entangling palm fibers and flax or stiff fibers such as thick synthetic fibers and hardening the same using rubber or the like, or a molded body (foam body) made from various kinds of expandable resin materials are used.

These cushion bodies have a curved face composed of convex and concave shapes satisfying ergonomic factors in order to maintain a seating posture which provides no fatigue despite long-hour seating. If it is intended to effectively manufacture the cushion bodies having such a complicated surface shape in large quantities considering its cushion performance, the aforementioned rock wool that requires a number of manufacturing processes cannot meet the demand.

In contrast, cushion bodies made from expandable resins have been used widely because it can be manufactured in a single process and various shapes can be obtained easily. That is, the cushion body made from expandable resins is molded into a desired shape at the same time as expansion molding when an expandable resin material such as expandable urethane resin is flown into a mold.

Further, the surface of the cushion body molded in this manner is generally deposited with a skin material such as various kinds of fiber cloth or natural or synthetic leather. In order to deposit the skin material on the surface of the cushion body, either a means for allowing a skin material to be adsorbed along a cavity surface of a mold and flowing an expandable resin material into the mold so that the cushion body is integrated with the rear surface of the skin material at the same time as molding of the cushion body or a means for molding a cushion body into a desired shape and covering and fixing a skin material to the surface of the cushion body has been employed.

In the case of using the means of integrating at the time of molding, as mentioned above, when a skin material is set along the inner surface of the mold, the skin material is adsorbed along the inner surface of the mold using an adsorption means. However, in order to deform the skin material so as to conform to the surface of the cushion body having a complex surface shape as described above, the skin material itself needs to be a material that has excellent elasticity. However, since there is a limit in the elasticity depending on a material, when the surface shape of the cushion body is complex, a number of wrinkles are likely to occur between the seating surface and the peripheral side surface in particular, and a lot of efforts have to be made to correct this.

According to this means, since the cushion body and the skin material are integrated on the entire surface, for example, when a strong force is applied in a direction where the skin material is shifted on the surface of the cushion body during use, a shearing force is applied between the skin material and the cushion body, a portion of the cushion body may be broken and the skin material may be separated. Further, a material that can be used as the skin material is naturally limited in order to eliminate the occurrence of wrinkles, and it is preferable to allow a slight movement between the skin material and the cushion body so that an excessive force is not applied between the skin material and the cushion body. Thus, instead of using the means for integrating the skin material at the same time as molding of the cushion body, a means of molding the cushion body in a desired shape and covering the obtained cushion body with the skin material has become popular.

In the case of covering the skin material on the cushion body made from an expandable resin material, a method of using a molding hook and loop fastener made from a thermoplastic resin is generally used. For example, first, a molding hook and loop fastener having a plurality of engaging elements (male engaging elements) is set on a cavity surface of a mold that performs molding of the cushion body. At this time, the molding hook and loop fastener is placed and fixed to a projecting surface portion on a bottom surface of the mold corresponding to a depressed surface of the cushion body so that an engaging element forming surface of the molding hook and loop fastener faces the projecting surface portion.

Subsequently, by expansion-molding the cushion body by an expandable resin material being flown into the mold in which the molding hook and loop fastener is set, at the same time as the molding of the cushion body, the molding hook and loop fastener is embedded in and integrated with the depressed surface of the cushion body in a state where the engaging elements are exposed to the outside. During this expansion molding, it is important to prevent the expandable resin material of the cushion body from flowing up to the engaging element forming region of the molding hook and loop fastener.

The skin material made from various kinds of materials such as pile woven/knit fabric, natural leather and synthetic leather which are previously formed in a bag shape corresponding to the outer shape of the cushion body is covered on the surface of the cushion body obtained by the expansion molding described above. In this case, the female engaging elements disposed on the rear surface of the skin material are pressed against the engaging element forming surface of the molding hook and loop fastener that is integrated with the cushion body so that the skin material is fastened along the depressed surface of the cushion body. In this way, the skin material is prevented from floating from the cushion body.

In expansion molding for integrating the molding hook and loop fastener into the cushion body, a technique of preventing the expandable resin material from entering into the engaging element forming region of the molding hook and loop fastener during molding of the cushion body is disclosed, for example, in JP 2005-211198 A (Patent Document 1), WO 2010/016122 A (Patent Document 2), and U.S. Pat. No. 6,720,059 (Patent Document 3), and the like.

A molding hook and loop fastener disclosed in Patent Document 1 includes a planar substrate, first resin-entrance preventing walls disposed on left and right side edges along the length direction of the substrate, a number of engaging elements disposed between the first left and right resin-entrance preventing walls, and a second resin-entrance preventing wall that is disposed in a width direction of the substrate so as to partition the engaging elements into necessary regions in the length direction of the substrate.

In the molding hook and loop fastener disclosed in Patent Document 1, three rows of vertical wall arrays are disposed alternately in the first resin-entrance preventing wall, and a divided vertical wall piece having a height dimension smaller than that of the vertical wall array is disposed between the three rows of vertical wall arrays. Further, the engaging element of which the engaging head extends back and front in the length direction is disposed to be integrated with the second resin-entrance preventing wall.

According to the molding hook and loop fastener disclosed in Patent Document 1, due to the first resin-entrance preventing wall disposed to extend in the length direction of the substrate and the second resin-entrance preventing wall disposed in the width direction of the substrate, it is possible to prevent a foaming resin material from entering into the engaging element forming region of the substrate when the cushion body is expansion-molded.

In particular, in Patent Document 1, the vertical wall arrays of each row that constitute the first resin-entrance preventing wall are disposed intermittently, and the vertical wall arrays of the adjacent rows are disposed in such a positional relation that the vertical wall arrays overlap in the width direction. Due to this, the gaps between the vertical wall arrays of the first resin-entrance preventing wall are formed in a zigzag form while appropriately maintaining the flexibility of the molding hook and loop fastener. Even if the foaming resin material tries to enter into the engaging element forming region of the substrate through the gaps of the first resin-entrance preventing wall when the cushion body is expansion-molded, it is possible to easily stop the entrance of the foaming resin material in the middle of the gaps formed in a zigzag form in the first resin-entrance preventing wall. Further, in Patent Document 1, since the second resin-entrance preventing wall itself includes the engaging elements, it is possible to prevent a decrease in the bonding strength between the molding hook and loop fastener and the skin material due to the presence of the second resin-entrance preventing wall.

On the other hand, a molding hook and loop fastener disclosed in Patent Document 2 includes a planar substrate, resin-entrance preventing walls disposed on left and right side edges along a length direction of the substrate, a number of engaging elements disposed between the left and right resin-entrance preventing walls, and a linear magnetic body disposed along the length direction of the substrate. Moreover, each of the left and right resin-entrance preventing walls includes a pair of first and second magnetic body clamping portions that is disposed at a predetermined interval along the length direction of the substrate so as to clamp the linear magnetic body, an outer wall portion disposed on an outer side of the first and second magnetic body clamping portions, and a supporting portion that supports, from below, the linear magnetic body protruding from the surface of the substrate and clamped by the first and second magnetic body clamping portions.

According to the molding hook and loop fastener of Patent Document 2, since the linear magnetic body is clamped by the first and second magnetic body clamping portions and is supported by the supporting portion from below, the linear magnetic body can be disposed near the distal ends of the first and second magnetic body clamping portions located distant from the substrate. Thus, when magnets are embedded at a fastener mounting position of a mold, for example, if the linear magnetic body of the molding hook and loop fastener is disposed near the distal ends of the first and second magnetic body clamping portions as described above, since the attracting force between the magnets of the mold and the linear magnetic body of the molding hook and loop fastener becomes strong, the molding hook and loop fastener can be properly adhered to and held by the mold. As a result, it is possible to prevent the occurrence of a gap between the molding hook and loop fastener and the cavity surface of the mold and to effectively suppress the foaming resin material from entering into the engaging element forming region of the substrate.

In Patent Document 3, preventing wall portions having various shapes for preventing a foaming resin material from entering into an engaging element forming region of a substrate are proposed as the resin-entrance preventing walls disposed on the left and right side edges of a planar substrate.

PRIOR ART DOCUMENT

Patent Document

Patent Document 1: JP 2005-211198 A
Patent Document 2: WO 2010/016122 A
Patent Document 3: U.S. Pat. No. 6,720,059

DISCLOSURE OF THE INVENTION

Problem to be Solved by the Invention

For example, in a passenger seat of an automobile, an appropriately curved convex and concave surface is formed on the surface of the seat, and various convex and concave surfaces are also formed on the cushion body used in the seat in order to secure a seating posture that is considered to be most favorable from ergonomic viewpoints. Thus, when the molding hook and loop fastener as disclosed in Patent Documents 1 to 3, for example, is integrally molded to the convex and concave surface of the cushion body, the molding hook and loop fastener is mounted and fixed to a curved cavity surface of the mold, and the cushion body is expansion-molded.

In this case, in order to prevent the expandable resin material from entering into the engaging element forming region of the molding hook and loop fastener when the cushion body is molded, it is necessary to adhere the molding hook and loop fastener to the cavity surface in a state where the molding hook and loop fastener is curved so as to follow the convex and concave shape of the cavity surface (surface fastener adsorbing surface).

However, in the conventional molding hook and loop fastener as disclosed in Patent Documents 1 to 3, since the resin-entrance preventing wall is disposed to extend in the length direction of the substrate, the flexibility (bendability) of the molding hook and loop fastener may be impaired. Thus, for example, if the curvedness (that is, a change rate of inclination of the curved surface) of the fastener adsorbing surface of the mold increases, it is difficult to adhere the entire molding hook and loop fastener to the surface fastener adsorbing surface of the mold, and the end portions in the length direction of the molding hook and loop fastener may float.

When the molding hook and loop fastener floats from the fastener adsorbing surface of the mold, the expandable resin material enters into the gap between the mold and the molding hook and loop fastener when the cushion body is expansion-molded, and the expandable resin material enters into the engaging element forming region of the molding hook and loop fastener. As a result, since the engaging elements of the molding hook and loop fastener are covered with the expandable resin, it is difficult to obtain a desired coupling strength between the skin material and the molding hook and loop fastener that is molded integrally with the cushion body.

The invention has been made in view of the conventional problems, and a specific object of the invention is to provide a molding hook and loop fastener capable of stably adhering to a cavity surface of a expansion molding mold even when the cavity surface is greatly curved, preventing an expandable resin material from entering into an engaging element forming region, and stably securing a desired coupling strength between the molding hook and loop fastener and other members such as a skin material.

Means for Solving the Problems

In order to attain the object, a molding hook and loop fastener according to the invention includes, as a basic configuration, a planar substrate made from a thermoplastic resin and including a first surface and a second surface opposite to the first surface; barriers erected on the first surface near left and right side edges along a length direction of the substrate; and a plurality of engaging elements disposed between the left and right barriers, in which each of the left and right barriers includes at least two rows of vertical wall arrays, the vertical wall array of each row includes a plurality of vertical walls that are disposed intermittently in the length direction and are alternately disposed between the adjacent vertical wall arrays, and the molding hook and loop fastener is molded integrally with a foam body at the same time as molding of the foam body, mainly characterized in that: between two adjacent rows of vertical walls disposed alternately, each of the vertical walls disposed on one row is connected to two vertical walls disposed on the other row via a connecting part, and the connecting part connects one end portion in the length direction of the vertical wall disposed on one of the adjacent rows and the other end portion in the length direction of the vertical wall disposed on the other row.

In particular, it is preferable that the connecting part be configured to connect one end portion in the length direction of the vertical wall disposed on one of the adjacent rows and the other end portion in the length direction of the vertical wall disposed on the other row at such a position that the vertical walls are closest to each other.

Moreover, it is preferable that the connecting part have the same height dimension as a height dimension of the vertical wall from the substrate.

In the molding hook and loop fastener according to the invention, it is preferable that each vertical wall include a post portion erected from the substrate and a upper surface portion disposed at an upper end of the post portion so as to protrude in the length direction and a width direction of the substrate more than the upper end of the post portion.

In this case, it is particularly preferable that a dimension in the length direction of a boundary portion between the post portion and the upper surface portion of the vertical wall in the vertical wall array of each row be set to be the same as a dimension in the length direction of a gap between the boundary portions of the two vertical walls disposed adjacently in the vertical wall arrays of the adjacent rows or be set to be smaller than the dimension in the length direction of the gap.

Further, in the molding hook and loop fastener according to the invention, it is preferable that the engaging elements be disposed at a predetermined mounting pitch in the length direction of the substrate, and a mounting pitch of the vertical walls disposed in the vertical wall array of each row is set to be equal to or smaller than ½ of the mounting pitch of the engaging elements.

Further, in the molding hook and loop fastener according to the invention, it is preferable that the sum of areas of the upper surfaces of all of the vertical walls included in the barrier be set to be from 39% to 95% in relation to a barrier arrangement area that is calculated by the product between a dimension in the length direction of the barrier and a dimension from an inner wall surface of the vertical wall array of the barrier, disposed closest to the engaging element to an outer wall surface of the vertical wall array disposed on an outermost side.

Furthermore, in the molding hook and loop fastener according to the invention, it is preferable that the engaging elements be disposed at a predetermined pitch in a width direction of the substrate, a lateral wall portion is disposed along the width direction between the barrier and the engaging elements and between the engaging elements that are adjacent in the width direction, and an upper surface of the vertical wall array be disposed on the same plane as an upper surface of the lateral wall portion.

Effect of the Invention

The molding hook and loop fastener according to the invention includes the planar substrate, the barriers that are erected near the left and right side edges of the substrate and include at least two vertical wall arrays, the plurality of engaging elements disposed between the left and right barriers, and the connecting part that connects the vertical wall arrays disposed on the adjacent rows, in which the vertical wall arrays of each row include the plurality of vertical walls that is disposed intermittently in the length direction and is alternately disposed between the adjacent vertical wall arrays. Here, an alternate arrangement of vertical walls includes a staggered arrangement or a zigzag arrangement of vertical walls.

Moreover, between the vertical walls alternately disposed in two adjacent rows of vertical wall arrays, each of the vertical walls disposed on one row is connected to two vertical walls disposed adjacently on the other row via the connecting part. In this case, each connecting part connects one end portion in the length direction of the vertical wall disposed on one of the adjacent rows and the other end portion in the length direction of the vertical wall disposed on the other row.

In this manner, if each of the vertical walls that form the vertical wall arrays of each row is connected to two vertical walls disposed adjacently on the adjacent rows via the connecting part at the end portions in the longitudinal direction, even when the vertical walls of the adjacent rows are not disposed in such a positional relationship that the rows of vertical walls overlap greatly with each other in the width direction as in the molding hook and loop fastener disclosed in Patent Document 1, for example, the vertical wall array and the connecting part can prevent a foaming resin material from entering into an engaging element forming region when a foam body is expansion-molded. In the invention, the engaging element forming region means a region in which the plurality of engaging elements is formed on the first surface of the substrate and which is surrounded by the left and right barriers.

As above, in the invention, since a region in which the vertical walls disposed in the vertical wall arrays of the adjacent rows overlapping each other can be decreased as much as possible, it is possible to improve flexibility (bendability) of the molding hook and loop fastener. Thus, the molding hook and loop fastener can be bent in the vertical direction (height direction) along the length direction of the substrate, for example, easier than the conventional art.

Thus, even when a cavity surface of an expansion molding mold used for molding a foam body, for example, is greatly curved, the molding hook and loop fastener according to the invention can be stably adhered to the cavity surface in a state of being bent conforming to the curved shape of the cavity surface. Thus, it is possible to prevent the occurrence of a gap between the barrier of the molding hook and loop fastener and the cavity surface of the mold.

Due to this, in the molding hook and loop fastener according to the invention, even when the cavity surface is curved greatly, it is possible to reliably prevent the expandable resin material from entering into the engaging element forming region by flowing over the barrier of the molding hook and loop fastener when the foam body is expansion-molded. Thus, it is possible to stably maintain the inherent coupling strength (fastening strength) of the plurality of engaging elements formed in the molding hook and loop fastener.

In the invention, one end portion and the other end portion in the length direction of the vertical wall array are defined in such a way that, for example, when one vertical wall array is evenly divided into three portions of a front end portion, an intermediate portion, and a rear end portion so as to have an equal length dimension, the one end portion and the other end portion mean the front end portion and the rear end portion of the vertical wall array, in the length direction of the molding hook and loop fastener.

Thus, the fact that between two adjacent rows of vertical walls, the connecting part connects one end portion in the length direction of the vertical wall disposed on one row and the other end portion in the length direction of the vertical wall disposed on the other row means that a front end portion of the vertical wall disposed on one row is connected to a rear end portion of the vertical wall disposed on the other row, and a rear end portion of the vertical wall disposed on one row is connected to a front end portion of the vertical wall disposed on the other row. In particular, in this case, it is preferable that the connecting part connect a front edge (or a rear edge) in the length direction of the vertical wall disposed on one row and a rear edge (or a front edge) in the length direction of the vertical wall disposed on the other row.

Further, in the invention, it is preferable that the connecting part connect one end portion in the length direction of the vertical wall disposed in the vertical wall array of each row and the other end portion in the length direction of the vertical wall disposed in the vertical wall array of the adjacent row so that the vertical walls on both rows are connected with the smallest distance. That is, when the connecting part connects one end portion in the length direction of the vertical wall disposed on one of the adjacent rows and the other end portion in the length direction of the vertical wall disposed on the other row at such a position that the vertical walls on the rows are closest to each other, it is possible to decrease the influence of the connecting part on the flexibility of the molding hook and loop fastener and to prevent the flexibility of the molding hook and loop fastener from being impaired.

Moreover, in the invention, the connecting part has the same height dimension as the height dimension of the vertical wall from the substrate. Due to this, in the range of the height dimension of the vertical wall erected from the substrate, an outer side (outer surface side) of the barrier and an inner side (inner surface side) where the engaging elements of the barrier are disposed are completely separated by the vertical wall array and the connecting part. Thus, it is possible to reliably prevent the foaming resin material from entering into the engaging element forming region when the foam body is expansion-molded.

In the molding hook and loop fastener according to the invention, each vertical wall includes the post portion erected from the substrate and the upper surface portion disposed at the upper end of the post portion so as to protrude in the length direction and the width direction of the substrate more than the upper end of the post portion. Due to this, when the molding hook and loop fastener is adhered to the cavity surface of the mold, it is possible to increase an adhesion area between the upper surface portion of each of the vertical walls disposed in the molding hook and loop fastener and the cavity surface of the mold to improve adhesion properties of the molding hook and loop fastener. As a result, it is possible to more reliably prevent the expandable resin material from entering into the engaging element forming region by flowing over the barrier of the molding hook and loop fastener when the foam body is expansion-molded.

In this case, the dimension in the length direction of the boundary portion between the post portion and the upper surface portion of the vertical wall in the vertical wall array of each row is set to be the same as the dimension in the length direction of the gap between the boundary portions of the two vertical walls disposed adjacently in the vertical wall arrays of the adjacent rows or is set to be smaller than the dimension in the length direction of the gap. Due to this, it is possible to form the barrier while decreasing the overlapped portions of the vertical walls disposed in the vertical wall arrays of the adjacent rows. Thus, it is possible to decrease the dimension in the substantial width direction of the barrier and to further improve the flexibility of the molding hook and loop fastener.

Further, in the molding hook and loop fastener according to the invention, the engaging elements are disposed at a predetermined mounting pitch in the length direction of the substrate, and the mounting pitch of the vertical walls disposed in the vertical wall array of each row is set to be equal to or smaller than ½ of the mounting pitch of the engaging elements. Since the mounting pitch of the vertical walls is set in this manner, it is possible to decrease the dimension in the length direction of each vertical wall, and to form at least two gaps between the vertical walls of the vertical wall array of each row for each mounting pitch of the engaging elements. Thus, it is possible to further improve the flexibility of the molding hook and loop fastener.

If the mounting pitch of the vertical walls is too small, an arrangement density of the connecting parts that connect the vertical wall arrays of the adjacent rows increases too much, which may impair the flexibility of the molding hook and loop fastener. Thus, it is preferable that the mounting pitch of the vertical wall arrays disposed on each row is set to be equal to or more than ¼ of the mounting pitch of the engaging elements.

Further, in the molding hook and loop fastener according to the invention, the sum of areas of the upper surfaces of all of the vertical walls included in the barrier is set to be from 39% to 95% in relation to a barrier arrangement area that is calculated by the product between a dimension in the length direction of the barrier and a dimension from an inner wall surface of the vertical wall array of the barrier, disposed closest to the engaging element to an outer wall surface of the vertical wall array disposed on an outermost side.

As above, since the sum of areas of the upper surfaces of all of the vertical walls is equal to or more than 39% of the barrier arrangement area of the molding hook and loop fastener, when the molding hook and loop fastener is adhered to the cavity surface of the mold, the adhesion properties for the adhering molding hook and loop fastener to the cavity surface of the mold are improved. Thus, it is possible to effectively prevent the expandable resin material from entering into the engaging element forming region when the foam body is expansion-molded. Moreover, since the sum of areas of the upper surfaces of all of the vertical walls is equal to or smaller than 95% of the barrier arrangement area of the molding hook and loop fastener, it is possible to stably secure the flexibility of the molding hook and loop fastener.

Furthermore, in the molding hook and loop fastener according to the invention, the engaging elements are disposed at a predetermined pitch in a width direction of the substrate, a lateral wall portion is disposed along the width direction between the barrier and the engaging elements and between the engaging elements that are adjacent in the width direction, and an upper surface of the vertical wall array is disposed on the same plane as an upper surface of the lateral wall portion. Due to this, the lateral wall portion and the engaging element can prevent the expandable resin material from entering between the left and right barriers from the end portion sides (that is, the front end portion and rear end portion sides) in the length direction of the molding hook and loop fastener when the molding hook and loop fastener is adhered to the cavity surface of the mold.

In particular, in this case, even when the molding hook and loop fastener according to the invention is cut into a desired length so as to correspond to the size, shape, and the like of the mold, since the lateral wall portions and the engaging elements are erected at a predetermined interval in the length direction, it is possible to prevent entrance of the expandable resin material at the positions where the lateral wall portions and the engaging elements are disposed. Thus, it is possible to prevent a decrease in a coupling strength of the engaging elements of the molding hook and loop fastener.

MODE(S) FOR CARRYING OUT THE INVENTION

Hereinafter, modes for carrying out the invention will be described with respect to embodiments with reference to the drawings. The invention is not limited to the embodiments described below, and various changes can be made as long as substantially the same configuration and the same function and effect as the invention are implemented are attained.

First Embodiment

Figure 1:
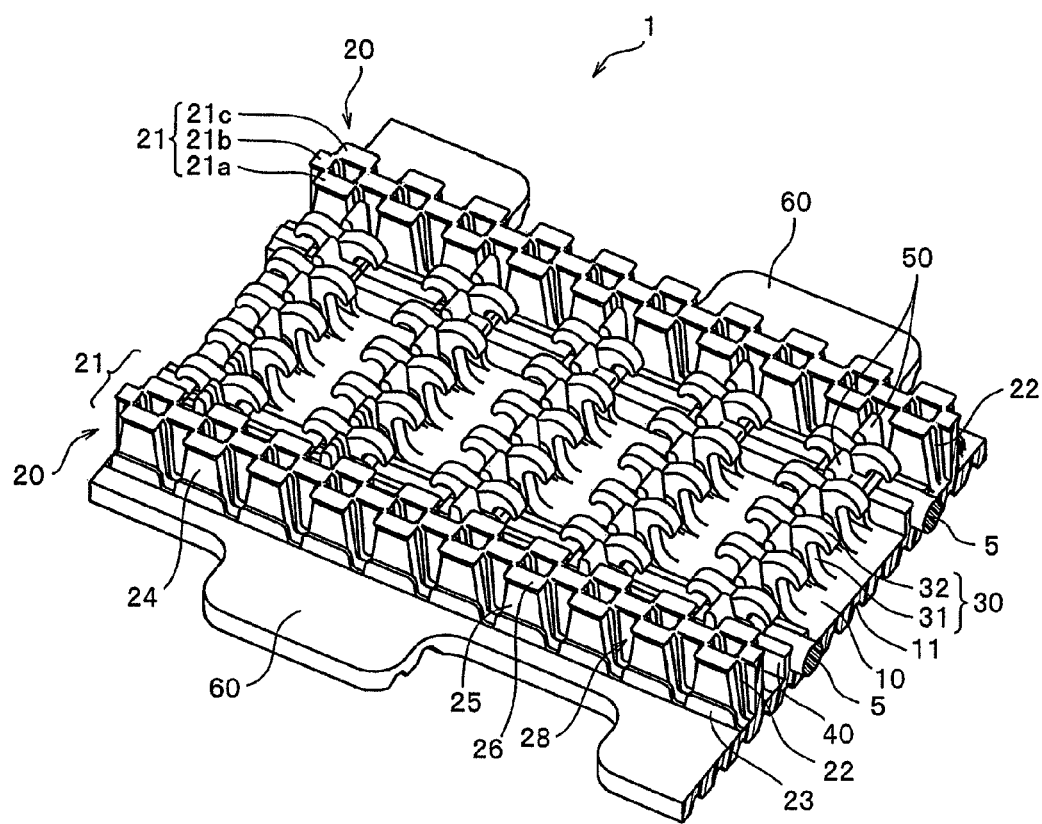
FIG. 1 is a perspective view showing a molding hook and loop fastener according to a first embodiment of the invention.
Figure 2:
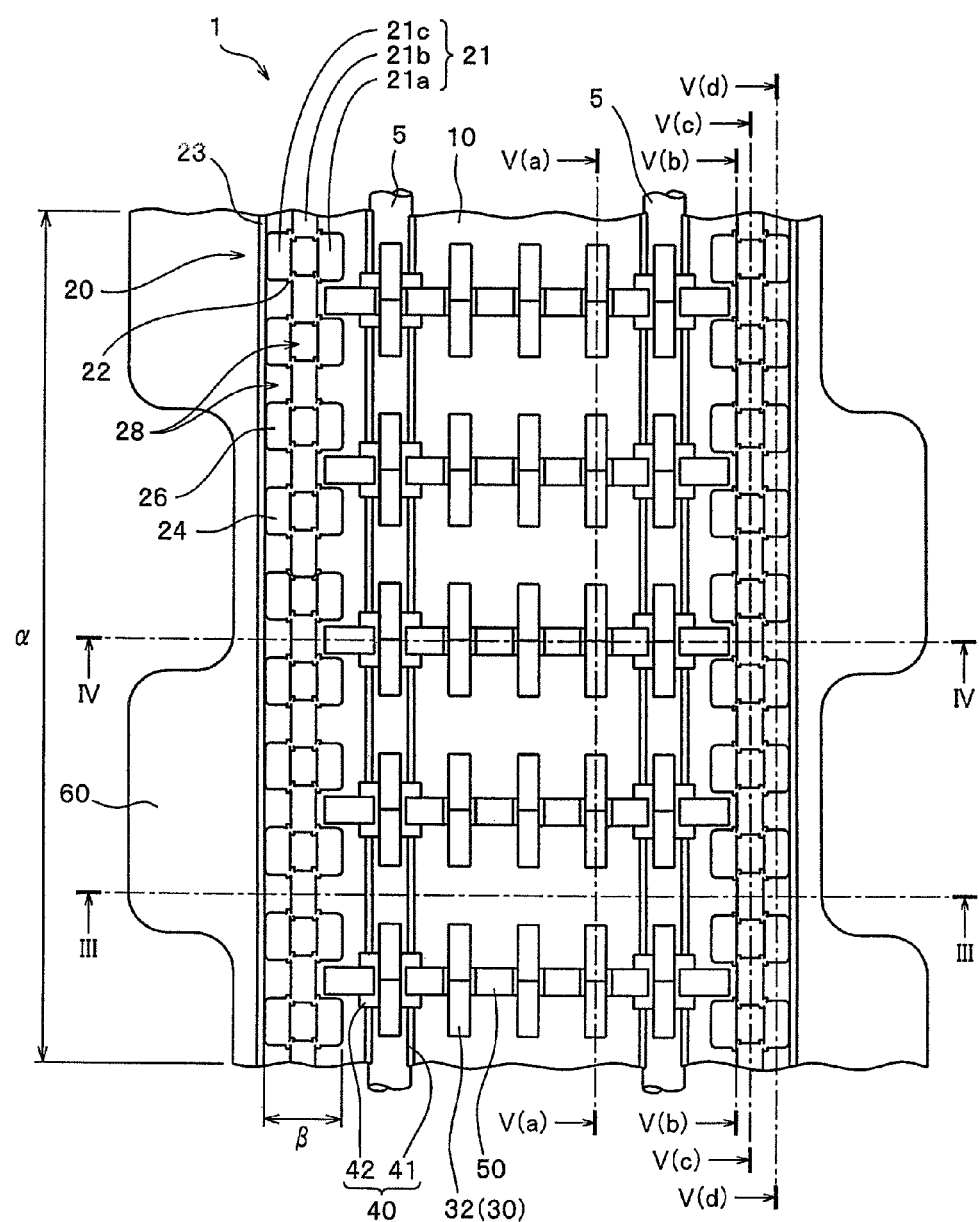
FIG. 2 is a front view of the molding hook and loop fastener.
Figure 3:
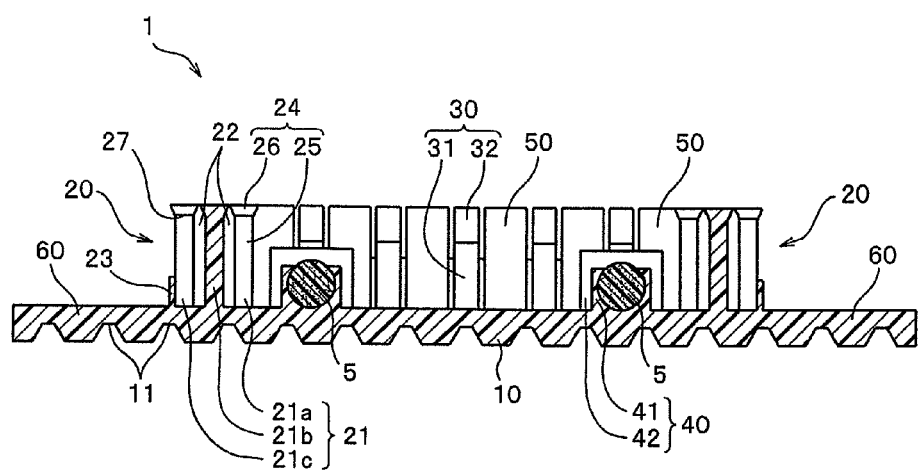
FIG. 3 is a cross-sectional view along line in FIG. 2.
Figure 4:
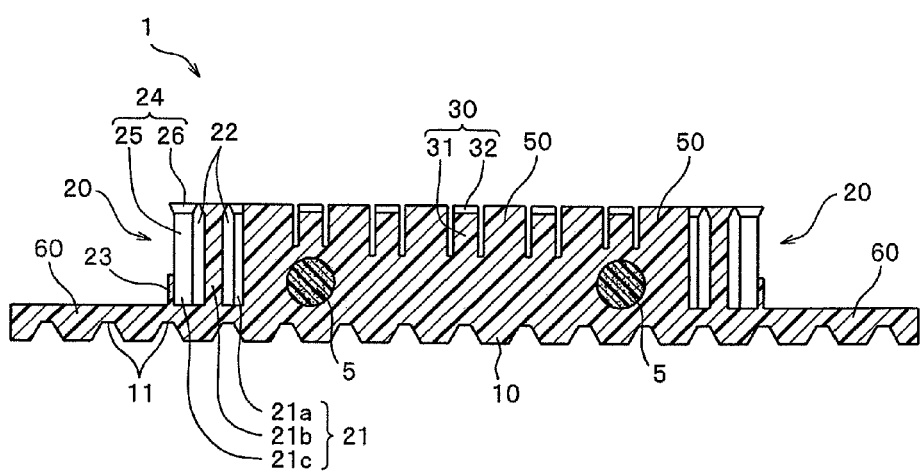
FIG. 4 is a cross-sectional view along line IV-IV in FIG. 2.
Figure 5:
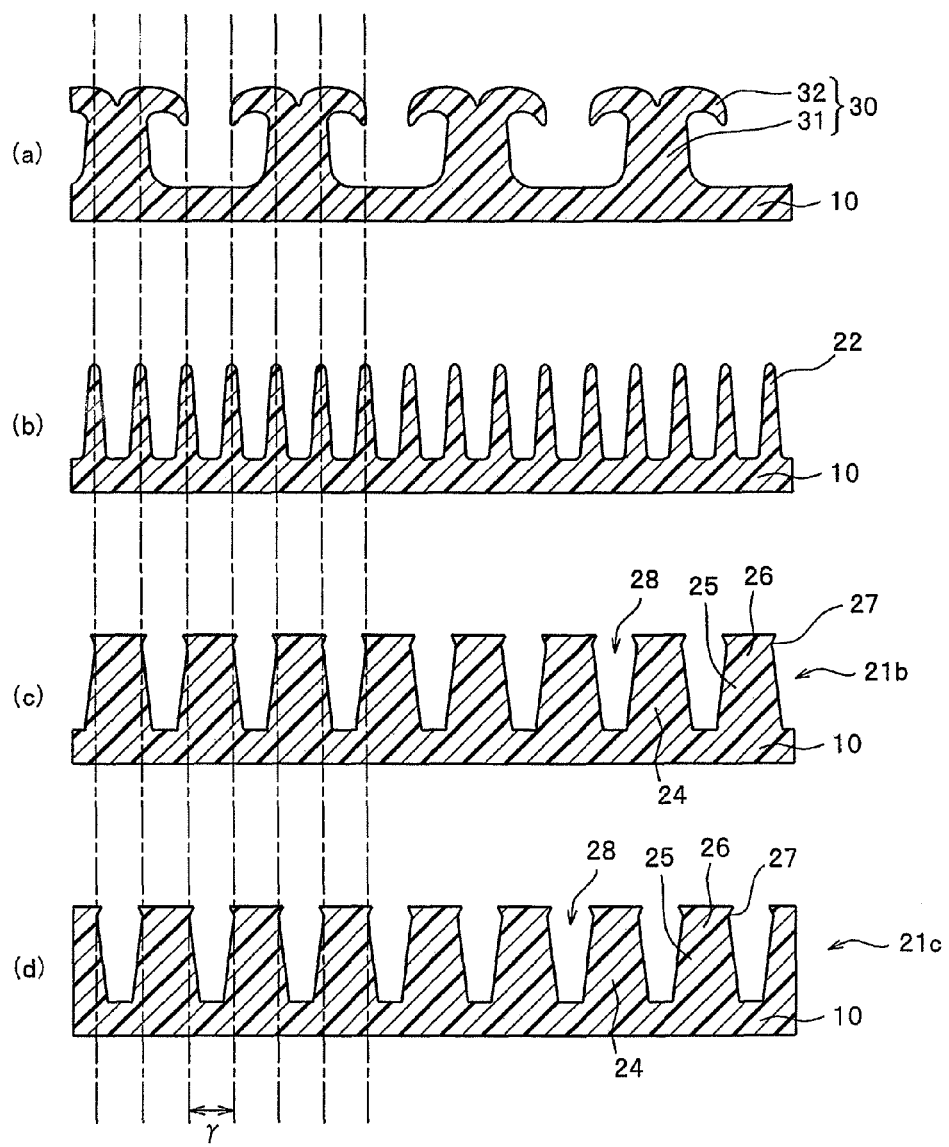
FIG. 5 is a cross-sectional views along lines V(a)-V(a) to V(d)-V(d) in FIG. 2, respectively.

FIG. 1 is a perspective view showing a molding hook and loop fastener according to a first embodiment, and FIG. 2 is a front view of the molding hook and loop fastener. Moreover, FIGS. 3 to 5 are cross-sectional views of the molding hook and loop fastener along respective lines illustrated in FIG. 2.

In the following description, a length direction of a substrate of a molding hook and loop fastener will be defined as a front-back direction, and a width direction of the substrate will be defined as a horizontal direction. Moreover, a front-rear direction of the substrate will be defined as a vertical direction, and in particular, a direction toward a side of the substrate where engaging elements are disposed is defined as an upper direction, and the opposite direction is defined as a lower direction.

A molding hook and loop fastener 1 according to the first embodiment includes a planar substrate 10, barriers 20 formed on an upper surface (first surface) near the left and right side edges of the substrate 10, a plurality of engaging elements 30 (male engaging elements) disposed between the left and right barriers 20, a magnetic body holding portion 40 disposed in the inner side of the barriers 20, a lateral wall portion 50 disposed along the width direction, and a flange portion 60 provided to extend outward in the width direction from the left and right side edges of the substrate 10. Further, a linear magnetic body 5 is molded integrally with the molding hook and loop fastener 1 in a state where the linear magnetic body 5 is held by a magnetic body holding portion 40 along the length direction.

The molding hook and loop fastener 1 is formed by injection-molding a thermoplastic resin material, and a thermoplastic resin material such as a polyamide resin, a polyester resin, a polypropylene resin, a PVC resin, an ABS resin, or a polyethylene resin can be used as a material of the molding hook and loop fastener 1.

Moreover, the linear magnetic body 5 that is molded integrally with the molding hook and loop fastener 1 has a circular cross-sectional shape and is configured to be curved or bent. The linear magnetic body 5 is made from a material that has magnetically attractable or magnetically attracting properties, and is preferably made from a material that is softer than the material of the substrate 10 of the molding hook and loop fastener 1.

In this case, examples of the magnetically attractable material of the linear magnetic body 5 include a monofilament in which magnetic particles made from alloys of iron, cobalt, nickel, and the like are mixed into a synthetic resin and a metallic twisted thread obtained by binding and twisting multiple metallic thin wires made from these alloys. On the other hand, examples of the magnetically attracting material of the linear magnetic body 5 include a magnetized wire rod, specifically, a metallic linear magnet and a linear rubber magnet obtained by impregnating a magnetic iron oxide into rubber and magnetizing the rubber. In the invention, a thin tape-shaped magnetic body may be used instead of the linear magnetic body.

In the first embodiment, the substrate 10 has such a small thickness that the molding hook and loop fastener 1 can be bent in the vertical direction. Moreover, a flat surface is formed on an upper surface side of the substrate 10 between the engaging elements 30 that are disposed at a predetermined mounting pitch in the length direction. On the other hand, a plurality of recess portions 11 (or projecting portions) that is parallel in the length direction is formed on a lower surface side of the substrate 10 in order to increase a bonding area between the molding hook and loop fastener 1 and a foam body described later to increase a fastening strength when the molding hook and loop fastener 1 is molded integrally with the foam body (cushion body).

In the first embodiment, the left and right barriers 20 are disposed at positions near the side edges that are located slightly toward the inner side from the left and right side edges of the substrate 10. In the invention, the positions of the left and right barriers 20 are not particularly limited as long as the positions are within the region of the side edge portion that is formed in a predetermined range (for example, within 20% of the width dimension of the substrate 10 toward the inner side from the left or right side edges of the substrate 10) toward the inner side of the substrate 10 from the left or right side edge of the substrate 10.

Further, each of the left and right barriers 20 includes three rows of vertical wall arrays 21 disposed along the length direction, a connecting part 22 that connects the vertical wall arrays 21 disposed on the adjacent rows, and a reinforcing portion 23 disposed on an outer wall surface side of the vertical wall array 21 that is disposed on the outermost side. In the embodiment, vertical wall arrays 21 on a row of the barrier 20 that is closest to the engaging element 30 are referred to as a first row of vertical wall array 21a, vertical wall arrays 21 on a row disposed on the outer side of the first row of vertical wall arrays 21a are referred to as a second row of vertical wall arrays 21b, and vertical wall arrays 21 on a row disposed on the outermost side are referred to as a third row of vertical wall arrays 21c.

In the left and right barriers 20, the vertical wall array 21 of each row includes a plurality of vertical walls 24 that are disposed intermittently at a predetermined mounting pitch in the length direction, and a gap 28 is provided between two vertical walls 24 that are adjacent in the length direction.

In this case, the mounting pitch of the vertical walls 24 disposed in the vertical wall array 21 of each row is set to ½ of a mounting pitch in the length direction of the engaging elements 30 described later. Moreover, the vertical walls 24 of the first to third rows of vertical wall arrays 21a to 21c are disposed in a staggered form so that the vertical walls 24 are alternately arranged between the respective rows. In particular, between the first and second rows of vertical wall arrays 21a and 21b and between the second and third rows of vertical wall arrays 21b and 21c, the vertical walls 24 are alternately disposed in the length direction at a mounting pitch of ½ of the mounting pitch of the vertical wall arrays.

Further, each vertical wall 24 includes the post portion 25 erected from the substrate 10 and the upper surface portion 26 disposed at the upper end of the post portion 25. A height dimension (dimension in the vertical direction) of each vertical wall 24 from the substrate 10 is set to be the same as the height dimension of the engaging element 30 from the substrate 10.

In the first embodiment, the post portion 25 of each of the vertical walls 24 has a truncated pyramidal shape that is long and thin in the length direction, and the inner wall surface and the outer wall surface (the left and right side wall surfaces) of the post portion 25 are parallel to each other. Further, the front and rear wall surfaces of the post portion 25 are inclined in relation to the vertical direction so that the dimension in the length direction of the post portion 25 gradually decrease as it advances upward, and the post portion 25 has an approximately trapezoidal shape when the post portion 25 is seen from the left and right side wall surfaces.

The upper surface portion 26 of each of the vertical walls 24 is formed so as to protrude in the length direction and the width direction more than the upper end of the post portion 25, and the upper surface of the upper surface portion 26 is flat. Since the vertical walls 24 disposed in the vertical wall array 21 of each row have such an upper surface portion 26, when the molding hook and loop fastener 1 is adhered to a cavity surface 77a of a mold 77 (see FIG. 11) as will be described later, it is possible to increase an adhesion area between the vertical wall array 21 (the vertical wall 24) of the molding hook and loop fastener 1 and the cavity surface 77a of the mold 77 and to improve the adhesion properties of the molding hook and loop fastener 1.

In this case, as shown in FIG. 2, when the dimension in the length direction of the barrier 20 is α, and the dimension from the position of the inner wall surface of the first row of vertical wall arrays 21a to the position of the outer wall surface of the third row of vertical wall arrays 21c is β, the sum of areas of the upper surfaces of all of the vertical walls 24 disposed in an arrangement region of the barrier 20 is set to be 39% or more and 95% or less in relation to the barrier arrangement area represented by the product between the dimension α and the dimension β.

That is, since the sum of areas of the upper surfaces of all of the vertical walls 24 disposed in the arrangement region of the barrier 20 is 39% or more, and preferably 50% or more, in relation to the barrier arrangement area of the molding hook and loop fastener 1, it is possible to increase the adhesion properties of the molding hook and loop fastener 1 when the molding hook and loop fastener 1 is adhered to the cavity surface 77a of the mold 77. Further, it is possible to prevent an expandable resin material from entering into a formation region (hereinafter referred to as an engaging element forming region) of the engaging elements 30 when a foam body (cushion body) is expansion-molded as will be described later.

Further, since the sum of areas of the upper surfaces of all of the vertical walls 24 disposed in the arrangement region of the barrier 20 is 95% or less, and preferably 80% or less, in relation to the barrier arrangement area of the molding hook and loop fastener 1, it is possible to appropriately secure the size of the gap 28 formed between the vertical wall arrays 21 of the barrier 20 and to prevent the flexibility of the molding hook and loop fastener 1 from being impaired.

Furthermore, in the first embodiment, the dimension in the length direction of the boundary portion 27 between the post portion 25 and the upper surface portion 26 of each vertical wall 24 in the first to third rows of vertical wall arrays 21a to 21c is set to be the same as the dimension in the length direction of the gap 28 between the boundary portions 27 of the two vertical walls 24 that are disposed adjacently in the vertical wall array 21 of the adjacent row, or is set to be smaller than the dimension in the length direction of the gap 28.

That is, looking at the second row of vertical wall arrays 21b (see FIG. 5(*c*)), a dimension $\gamma$ in the length direction of the boundary portion 27 between the post portion 25 and the upper surface portion 26 of each vertical wall 24 is set to be the same as the dimension in the length direction of the gap 28 between the boundary portions 27 of two vertical walls 24 that are disposed adjacently in the length direction in the first and third rows of vertical wall arrays 21a and 21c that are adjacent to the second row of vertical wall array 21b (see FIG. 5(*d*)), or is set to be smaller than the dimension in the length direction of the gap 28.

Since the vertical walls 24 are erected to the above-described size between the adjacent rows of vertical wall arrays 21, it is possible to form the barrier 20 while decreasing the area of portions where the vertical walls 24 disposed on the adjacent rows overlap each other in the width direction. Thus, it is possible to further improve the flexibility of the molding hook and loop fastener 1.

Moreover, in the first embodiment, the connecting part 22 is disposed so as to connect the front end portion of the vertical wall 24 disposed in the vertical wall array 21 of each row and the rear end portion of the vertical wall 24 disposed in the vertical wall array 21 of a row adjacent to the row. That is, the connecting part 22 of the first embodiment connects the front end portions of the vertical walls 24 disposed in the first and third rows of vertical wall arrays 21a and 21c and the rear end portions of the vertical walls 24 disposed in the second row of vertical wall arrays 21b and connects the front end portions of the vertical walls 24 disposed in the second row of vertical wall arrays 21b and the rear end portions of the vertical walls 24 disposed in the first and third rows of vertical wall arrays 21a and 21c. In this case, each connecting part 22 connects the corner portion (front edge) on the front wall surface side of the vertical wall 24 disposed in each row and the corner portion (rear edge) on the rear wall surface side of the vertical wall 24 disposed in rows that are adjacent to the row.

Due to such a connecting part 22, one vertical wall 24 is connected to two vertical walls 24 that are disposed adjacently in the adjacent rows of vertical wall arrays 21 (since the vertical wall 24 disposed in the second row of vertical wall arrays 21b is connected to two vertical walls 24 disposed in the first row of vertical wall arrays 21a and two vertical walls 24 disposed in the third row of vertical wall arrays 21c via the connecting part 22, the vertical wall 24 is connected to four vertical walls 24 in total). In particular, since the connecting part 22 of the first embodiment connects the front end portion of the vertical wall 24 disposed in one row and the rear end portion of the vertical wall 24 disposed on the other row at the closest position, each vertical wall 24 is connected to the vertical walls 24 disposed in the adjacent rows of vertical wall arrays 21 by the connecting part 22 with the smallest distance.

Further, in the first embodiment, the height dimension of each connecting part 22 from the substrate 10 is set to be the same as the height dimension of the vertical wall 24 from the substrate 10. Here, the fact that the height dimension of the connecting part 22 is the same as the height dimension of the vertical wall 24 includes a case where there is a small error. For example, the fact includes a case where the height dimension of the connecting part 22 is approximately the same as the height dimension of the vertical wall 24 and a small gap is formed between the cavity surface 77a and the connecting part 22 or the vertical wall 24 such that an expandable resin material cannot pass through the gap when the molding hook and loop fastener 1 is adhered to the cavity surface 77a of the mold 77.

Since the connecting parts 22 are disposed in the barrier 20 as in the above-described manner, the outer side (that is, the side of a region where the foam body is molded) of the barrier 20 and the inner side (that is, the engaging element forming region side) where the engaging elements 30 are disposed can be completely separated by the vertical wall array 21 and the connecting part 22 in a range of the height dimension where the barrier 20 is erected. Thus, when the foam body is expansion-molded as will be described later, it is possible to reliably prevent the expandable resin material from entering into the inner side of the barrier 20 from the outer side while flowing over the barrier 20.

In this case, since the respective connecting parts 22 disposed in the barrier 20 are narrow, the connecting parts 22 are easily elastically deformed more than the vertical wall array 21, for example. Thus, when the molding hook and loop fastener 1 is curved in the vertical direction along the length direction, the connecting parts 22 are elastically deformed to increase or decrease the gap 28 formed between the vertical walls 24. As a result, it is possible to easily make the molding hook and loop fastener 1 curved or bent.

The connecting parts 22 of the first embodiment are provided between the adjacent two rows of vertical walls 24 as described above. However, in the invention, for example, when the dimensions in the length direction and the width direction of each vertical wall are set to be larger than those of the first embodiment, and the adjacent two rows of vertical walls are directly integrated, the connecting part may be formed of a portion (region) of the vertical wall, which is connected to the adjacent rows of vertical walls.

The plurality of engaging elements 30 of the first embodiment is erected at a predetermined mounting pitch in the length direction and the width direction so that a predetermined coupling strength (fastening strength) is obtained between the engaging elements and a skin material covered on the foam body (cushion body). In particular, the engaging elements 30 of the first embodiment are arranged in rows at a predetermined mounting pitch in the length direction, and the row of engaging elements 30 are arranged in five rows in the width direction, whereby the engaging element forming region is formed.

Moreover, each engaging element 30 includes a rising portion 31 that rises vertically from the upper surface of the substrate 10 and a hook-shaped engaging head 32 that extends from the upper end of the rising portion 31 while being curved back and front in the length direction, and forms a so-called male engaging element. Further, the height dimension of each engaging element 30 from the substrate 10 is set to be the same as the height dimension of the vertical wall 24 from the substrate 10 as described above. In the invention, the shape, the dimensions, the mounting pitch, and the like of the engaging elements 30 are not particularly limited but may be changed optionally.

In this case, the linear magnetic bodies 5 are disposed near the upper surface of the substrate 10 along the rows of engaging elements 30 disposed closest to the left and right barriers 20, and the left and right linear magnetic bodies 5 are held by the magnetic body holding portions 40. The magnetic body holding portion 40 that holds the linear magnetic body 5 includes a first holding portion 41 that is erected on the upper surface of the substrate 10 so as to clamp the linear magnetic body 5 from the left and right sides along the length direction and a second holding portion 42 that is disposed at the erection position of the engaging element 30 so as to reinforce the engaging element 30 and surround and hold the linear magnetic body 5.

The lateral wall portion 50 of the first embodiment is disposed along the width direction between the second row of vertical wall arrays 21b of the barrier 20 and the engaging element 30 and between the engaging elements 30 that are adjacent in the width direction. Further, the respective lateral wall portions 50 are connected to the engaging elements 30 that are disposed adjacently at the lower end portions (the end portions close to the substrate 10). Due to this, the lateral wall portions 50 and the engaging elements 30 are reinforced.

Further, the height dimension of each lateral wall portion 50 from the substrate 10 is set to be the same as the height dimension of the vertical wall 24 and the connecting portion 22 from the substrate 10 and the height dimension of the engaging element 30 from the substrate 10. As above, in the molding hook and loop fastener 1 of the first embodiment, the vertical wall 24, the connecting portion 22, the lateral wall portion 50 and the engaging element 30 have the same height dimension, and the upper surfaces or the upper ends thereof are disposed on the same plane. Thus, by adhering the molding hook and loop fastener 1 to the cavity surface 77a of the mold 77 when the foam body is expansion-molded as will be described below, it is possible to prevent the expandable resin material from entering into the engaging element forming region from the width direction by flowing over the vertical wall array 21 and to prevent the expandable resin material from entering from the length direction by flowing over the lateral wall portion 50 and the engaging element 30.

Although the lateral wall portion 50 and the engaging element 30 are connected at the lower end portions thereof as described above, the upper end portions thereof are separated with a small gap. Even when the upper end portions of the lateral wall portion 50 and the engaging element 30 are separated from each other, since the separation gap is very small, the expandable resin material does not enter into the engaging element forming region from the gap between the lateral wall portion 50 and the engaging element 30 when the foam body is expansion-molded.

The flange portions 60 of the first embodiment are formed in a tongue shape so as to extend outward from the left and right side edges of the substrate 10, and the left and right flange portions 60 are alternately disposed with a predetermined mounting pitch in the length direction. Further, the upper surface of the left and right flange portions 60 are disposed on the same plane as the upper surface of the substrate 10, and a plurality of recess portions 11 (or projecting portions) that are parallel in the length direction are formed on the lower surface side of the flange portions 60 similar to the lower surface side of the substrate 10. The left and right flange portions 60 are portions which are embedded in the foam body when the foam body is expansion-molded and are provided to tightly fix the molding hook and loop fastener 1 to the foam body.

Figure 6:
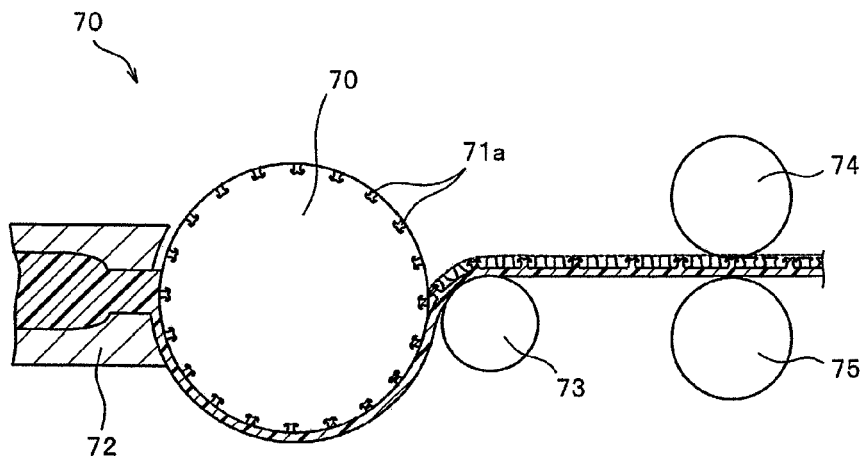
FIG. 6 is a schematic explanatory view for explaining a portion of a molding step of the molding hook and loop fastener.

The molding hook and loop fastener 1 according to the first embodiment having such a configuration can be manufactured using a manufacturing apparatus 70 illustrated in FIG. 6. Here, a method of manufacturing the molding hook and loop fastener 1 will be described briefly with reference to FIGS. 6 to 10.

The manufacturing apparatus 70 illustrated in FIG. 6 includes a die wheel 71 that rotates in one direction (counterclockwise direction in the figure), a molten resin continuous extrusion nozzle 72 disposed to face a circumferential surface of the die wheel 71, a pickup roll 73 disposed on a downstream side in the rotation direction of the die wheel 71 more than the continuous extrusion nozzle 72 so as to face the circumferential surface of the die wheel 71, a pair of upper and lower press rolls 74 and 75 disposed on a further downstream side of the pickup roll 73, a linear magnetic body supply portion (not illustrated) disposed on an upstream side in the rotation direction of the die wheel 71 than the continuous extrusion nozzle 72 so as to introduce the linear magnetic body 5 to be located between the opposing surfaces of the die wheel 71 and the continuous extrusion nozzle 72.

Molding cavities 71a for molding the barrier 20, the engaging element 30, the lateral wall portion 50, and the magnetic body holding portion 40 of the molding hook and loop fastener 1 are formed on the circumferential surface of the die wheel 71 included in the manufacturing apparatus 70. In this case, molding cavities for the left and right barrier 20 are disposed at both side edge regions of the circumferential surface of the die wheel 71, and molding cavities for the engaging element 30, the lateral wall portion 50, and the magnetic body holding portion 40 are disposed in a central region of the circumferential surface between the molding cavities for the left and right barrier 20.

A coolant circulates inside the die wheel 71, whereby the die wheel 71 cools down. Further, a coolant tank (not illustrated) is disposed under the die wheel 71 so that a portion of the lower-half portion of the die wheel 71 is immersed.

The pair of upper and lower press rolls 74 and 75 includes a heater (not illustrated) inside, and the upper and lower press rolls 74 and 75 are heated to a predetermined temperature by the heaters.

When the molding hook and loop fastener 1 of the first embodiment is manufactured using the manufacturing apparatus 70 having the above configuration, first, a molten resin material is continuously extruded toward the circumferential surface of the die wheel 71 from the continuous extrusion nozzle 72. In this case, the die wheel 71 rotates in one direction, the molten resin extruded to the circumferential surface continuously molds the substrate 10 of the molding hook and loop fastener 1 at the gap 28 between the continuous extrusion nozzle 72 and the die wheel 71, and the barrier 20, the engaging element 30, the lateral wall portion 50, and the magnetic body holding portion 40 are sequentially molded at the respective molding cavities described above.

Further, concurrently with the extrusion of the molten resin material from the continuous extrusion nozzle 72, the linear magnetic body 5 is introduced from the linear magnetic body supply portion to the molten resin extrusion position and is molded integrally with the molding hook and loop fastener 1. In this case, since the linear magnetic body 5 is molded integrally with the molding hook and loop fastener 1 in a state where a portion thereof is exposed, two guide grooves for the linear magnetic body 5 are continuously formed in the circumferential direction of the die wheel 71 on the circumferential surface of the die wheel 71 in addition to the above-described molding cavities.

The molding hook and loop fastener 1 molded on the circumferential surface of the die wheel 71 is cooled, rotated counterclockwise, and solidified while being carried on the circumferential surface of the die wheel 71. After that, the molding hook and loop fastener 1 is continuously torn off from the circumferential surface of the die wheel 71 by the pickup roll 73.

Figure 7:
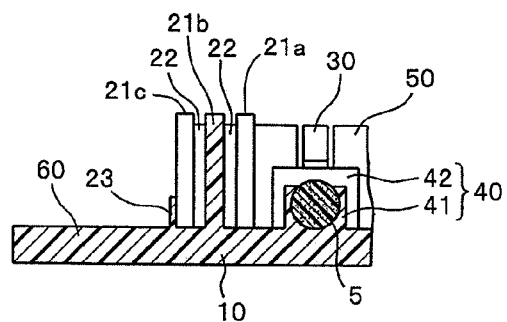
FIG. 7 is a cross-sectional view of the molding hook and loop fastener, showing a state before an upper surface portion of a vertical wall is formed.
Figure 8:
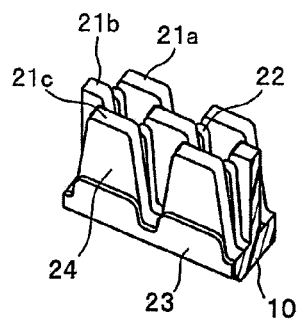
FIG. 8 is a perspective view of the molding hook and loop fastener, showing a state before an upper surface portion of a vertical wall is formed.

In this case, as illustrated in FIGS. 7 and 8, the molding hook and loop fastener 1 immediately after being torn off from the circumferential surface of the die wheel 71 by the pickup roll 73 is molded in a state where the upper surface portion 26 is not formed on the respective vertical walls 24 of the barrier 20, and the height dimension of the vertical wall 24 is larger than the height dimension of the connecting portion 22, the lateral wall portion 50, and the engaging element 30. Further, the recess portion 11 is not yet formed on the lower surface side of the substrate 10 and the flange portion 60 of the molding hook and loop fastener 1 immediately after the tearing, and the left and right flange portions 60 are not alternately formed as illustrated in FIGS. 1 and 2 but are formed in a continuous strip shape.

Subsequently, the molding hook and loop fastener 1 torn off from the circumferential surface of the die wheel 71 is conveyed toward the space between the upper and lower press rolls 74 and 75 and is pressed from the vertical direction by the press rolls 74 and 75.

Figure 9:
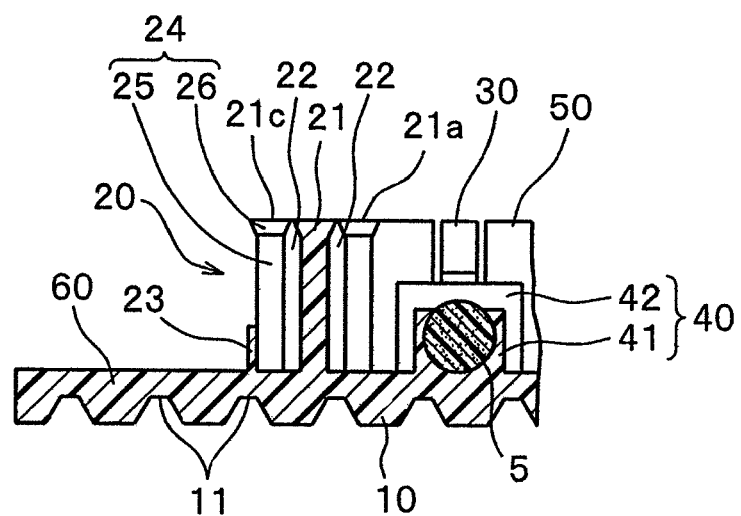
FIG. 9 is a cross-sectional view of the molding hook and loop fastener, showing a state where the upper surface portion of the vertical wall is formed.
Figure 10:
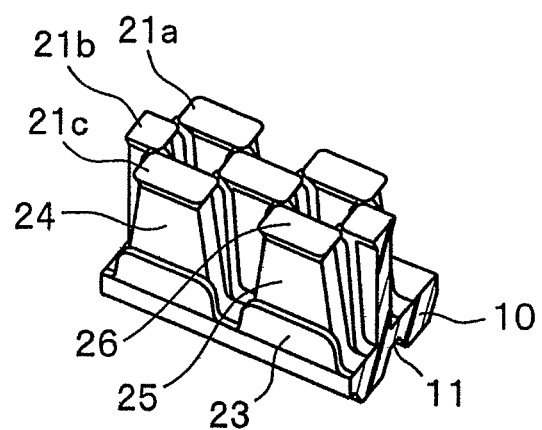
FIG. 10 is a perspective view of the molding hook and loop fastener, showing a state where the upper surface portion of the vertical wall is formed.

In this case, as illustrated in FIGS. 9 and 10, the upper end portions of the respective vertical walls 24 are pressed by the upper press roll 74, whereby the upper end portions of the vertical walls 24 are pressed to be expanded in the length direction and the width direction of the molding hook and loop fastener 1 so that a flat upper surface portion 26 is molded. As a result, the height dimension of each vertical wall 24 can be adjusted to be the same as the height dimension of the connecting portion 22, the lateral wall portion 50, and the engaging element 30. At the same time, the substrate 10 and the flange portion 60 of the molding hook and loop fastener 1 are pressed by the lower press roll 75, the recess portion 11 is formed along the length direction of the molding hook and loop fastener 1 on the lower surface side of the substrate 10 and the flange portion 60.

After that, the molding hook and loop fastener 1 having passed through the space between the upper and lower press rolls 74 and 75 is subjected to such processing that the left and right flange portions 60 having a strip shape are partially cut, whereby tongue-shaped flange portions 60 are formed along the length direction so as to alternate horizontally. Through the above steps, the molding hook and loop fastener 1 of the first embodiment having a shape as illustrated in FIGS. 1 and 2 is manufactured.

Figure 11:
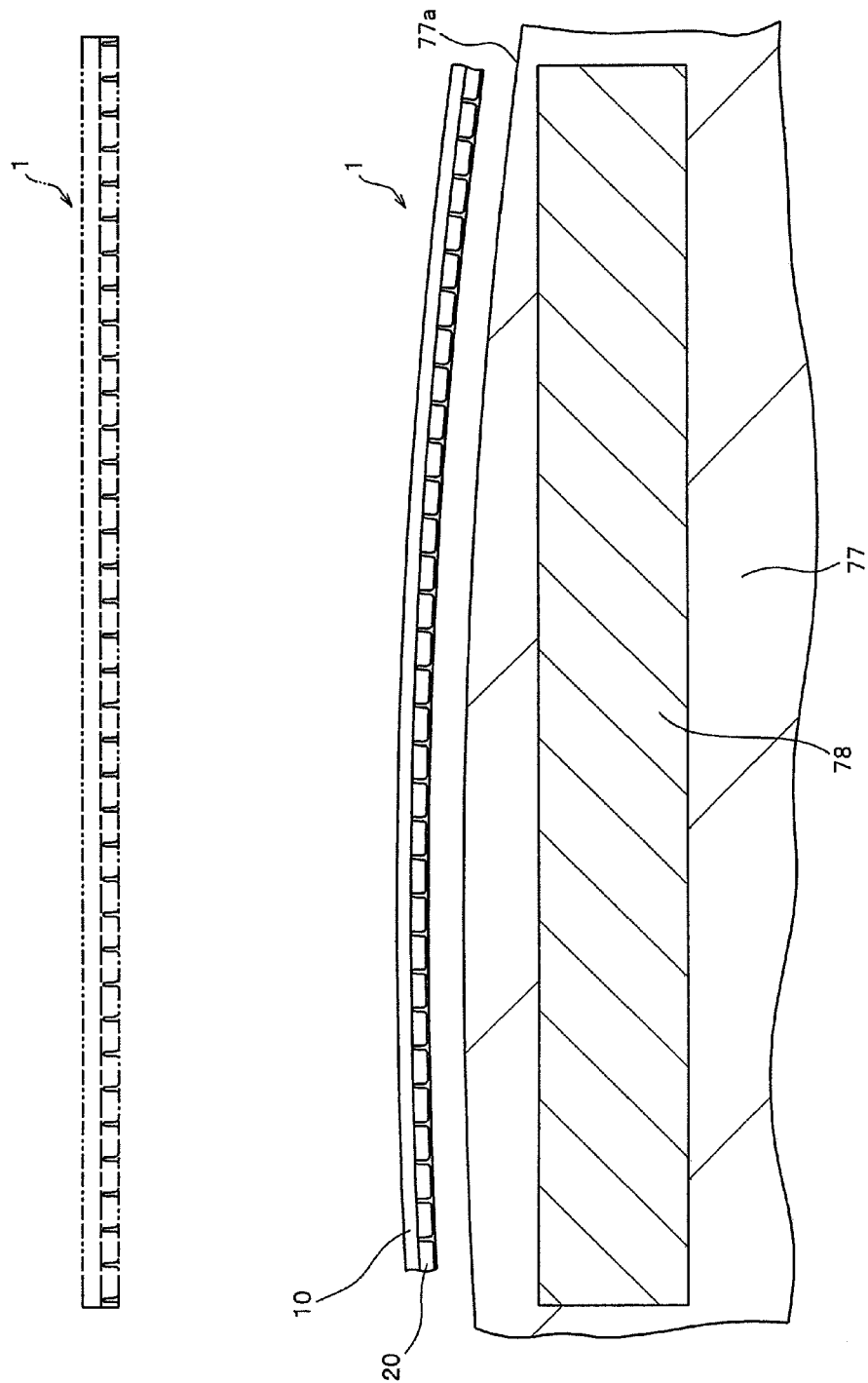
FIG. 11 is an explanatory view for explaining a state where a molding hook and loop fastener is adhered to a cavity surface having a curved surface, of a mold.

When the molding hook and loop fastener 1 of the first embodiment obtained in this manner is molded integrally with a cushion body (foam body) (not illustrated) of a passenger seat of an automobile, for example, first a long continuous molding hook and loop fastener 1 is cut into a necessary length, and the cut molding hook and loop fastener 1 is mounted on the cavity surface 77a of the cushion body molding mold 77 (see FIG. 11).

In this case, since magnets 78 are embedded in the mold 77 so as to correspond to the mounting positions of the molding hook and loop fastener 1, when the molding hook and loop fastener 1 is mounted so that the surface where the engaging elements 30 are formed faces the cavity surface 77a of the mold 77, the linear magnetic bodies 5 integrated with the molding hook and loop fastener 1 are attracted by the attracting force of the magnets 78, and the molding hook and loop fastener 1 is attracted and fixed to the cavity surface 77a of the mold 77.

Further, for example, when the molding hook and loop fastener 1 is disposed in a concave portion of a cushion body, the molding hook and loop fastener 1 need to be mounted on a flat-face projecting portion of the cavity surface 77a of the mold 77 corresponding to the concave portion of the cushion body. In this case, since the area of the portions where the vertical wall arrays 21 overlap each other in the width direction is small, and the connecting portions 22 that connect the vertical wall arrays 21 are elastically deformable, the molding hook and loop fastener 1 of the first embodiment provide favorable flexibility (in particular, the bending flexibility in the vertical direction is satisfactory).

Further, in the molding hook and loop fastener 1 of the first embodiment, the mounting pitch of the vertical walls 24 disposed in the vertical wall array 21 of each row is set to ½ of the mounting pitch in the length direction of the engaging elements 30 as described above, and the dimension in the length direction of each vertical wall 24 is smaller than that of the conventional molding hook and loop fastener 1 disclosed in Patent Documents 1 to 3. Thus, a decrease in the flexibility of the molding hook and loop fastener 1 resulting from formation of the vertical wall array 21 can be suppressed as much as possible.

Further, in the molding hook and loop fastener 1, since the portion of the substrate 10 where the engaging elements 30 are not disposed is more easily bent than the portion of the substrate 10 where the engaging elements 30 are erected, by configuring the portion of the substrates 10 where the engaging elements 30 are not disposed so as to be more easily bent, it is possible to improve flexibility of the molding hook and loop fastener 1.

In this respect, in the molding hook and loop fastener 1 of the first embodiment, by setting the mounting pitch of the vertical walls 24 disposed in the vertical wall array 21 of each row to ½ of the mounting pitch in the length direction of the engaging elements 30, it is possible to form two gaps 28 between the vertical walls 24 of each row in a region (that is, the portion of the substrate 10 where the engaging elements 30 are not disposed) between the engaging elements 30 in the length direction of the substrate 10. Due to this, in each row of vertical wall arrays 21, two gaps 28 that can be expanded or narrowed when the molding hook and loop fastener 1 is bent can be secured in the region of the substrate 10 where the engaging elements 30 are not disposed. Thus, it is possible to configure the molding hook and loop fastener 1 so as to be further easily bent and to further improve the flexibility of the molding hook and loop fastener 1.

That is, since the molding hook and loop fastener 1 of the first embodiment has excellent flexibility, when the molding hook and loop fastener 1 is mounted on the cavity surface 77*a* of the mold 77, the linear magnetic body 5 disposed over the entire length direction of the molding hook and loop fastener 1 is attracted by a magnetic force. Thus, the molding hook and loop fastener 1 is attracted and fixed to the cavity surface 77*a* of the mold 77, and the molding hook and loop fastener 1 can be easily curved conforming to the curved shape of the flat-face projecting portion of the cavity surface 77*a*. Thus, the molding hook and loop fastener 1 can be fixed to the cavity surface 77*a* of the mold 77 in a state where the upper surfaces or the upper end portions of the barrier 20, the lateral wall portion 50, and the engaging element 30 of the molding hook and loop fastener 1 are reliably adhered to the flat-face projecting portion of the cavity surface 77*a* over the entire length direction of the molding hook and loop fastener 1.

Further, in the molding hook and loop fastener 1 of the first embodiment, since the upper surface portion 26 of the vertical wall 24 as described above protrudes in the length direction and the width direction to increase the area of the upper surface of the vertical wall array 21, the barrier 20 of the molding hook and loop fastener 1 can be more stably adhered to the cavity surface 77*a* of the mold 77.

Figure 12:
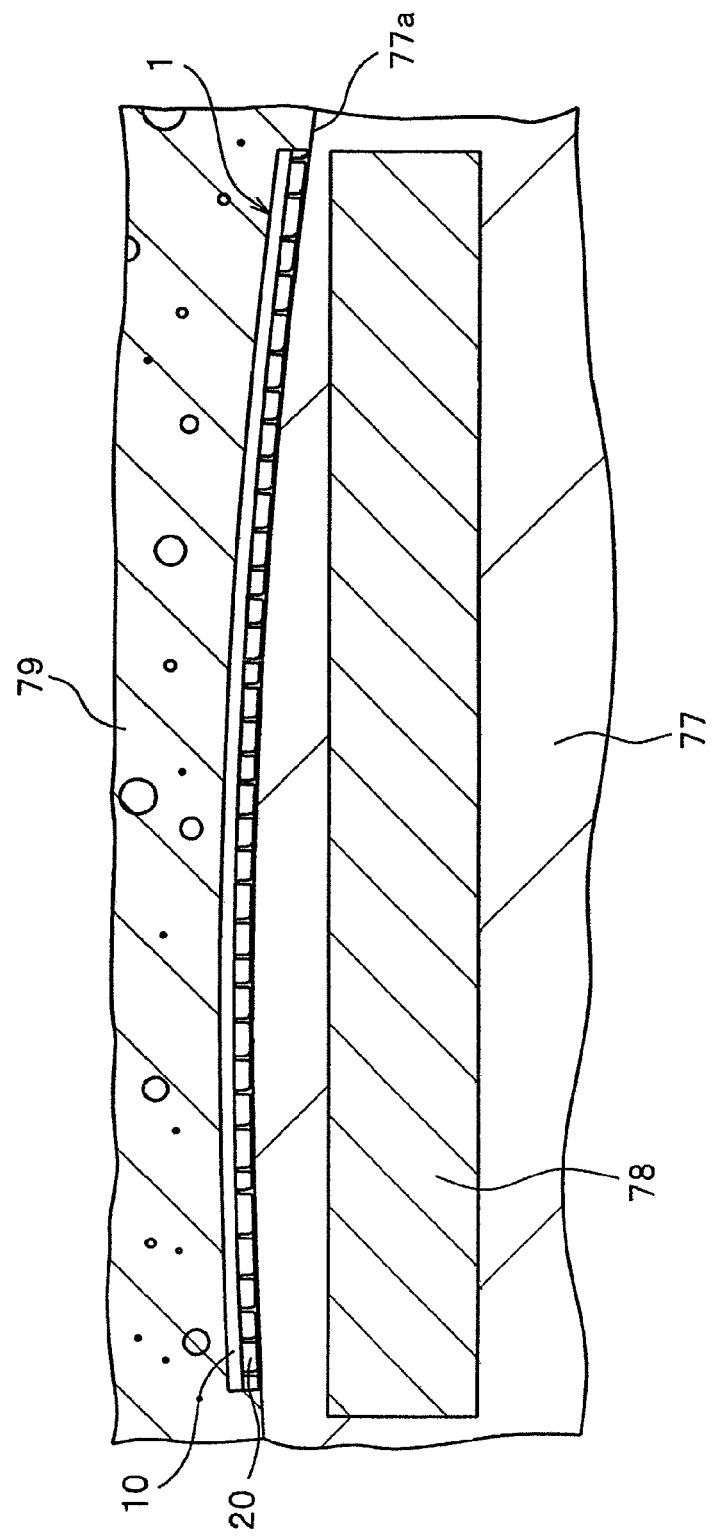
FIG. 12 is an explanatory view for explaining a state where a foam body is expansion-molded within a mold.

After the molding hook and loop fastener 1 of the first embodiment is adhered and fixed at a predetermined position of the cavity surface 77*a* of the mold 77 as described above, the expandable resin material is injected into the mold 77. As a result, the expandable resin material expands and flows toward the back surface (lower surface) of the molding hook and loop fastener 1 and the peripheries of the barrier 20 and the lateral wall portion 50 to be spread over the entire cavity of the mold 77. Thus, expansion molding of the cushion body (foam body) 79 is performed as illustrated in FIG. 12.

In this case, since the molding hook and loop fastener 1 is aligned and fixed at a predetermined position by the attracting action of the magnets 78 of the mold 77, the position of the molding hook and loop fastener 1 is not changed according to the flow and the expansion pressure of the expandable resin material. Further, even when the expandable resin material that flows within the cavity tries to enter into the engaging element forming region from both the left and right side edge sides of the molding hook and loop fastener 1, for example, since the vertical wall array 21 and the connecting part 22 of the molding hook and loop fastener 1 are adhered to the cavity surface 77*a* of the mold 77, and the respective vertical walls 24 disposed in the left and right barriers 20 are connected to two vertical walls 24 that are disposed adjacently in the vertical wall arrays 21 of the adjacent rows via the connecting parts 22, it is possible to reliably prevent the expandable resin material from entering into the engaging element forming region by flowing over the barrier 20.

In particular, in the molding hook and loop fastener 1 of the first embodiment, since the post portion 25 of each vertical wall 24 has a trapezoidal shape as described above, the dimension in the length direction of the gap 28 formed between the adjacent vertical walls 24 gradually increases toward the upper surface portion 26. Thus, when the expandable resin material enters into the gap 28 formed in the vertical wall array 21*c* of the third row, for example, the expandable resin material is likely to flow from the side of the gap 28 close to the substrate 10 toward the upper surface portion 26 (that is, in the gradually increasing direction of the dimension in the length direction of the gap 28). As a result, the flow of the expandable resin material causes an action that presses the upper surface portion 26 of the vertical wall 24 toward the cavity surface 77*a* of the mold 77, and the adhesion properties of allowing the barrier 20 to adhere to the cavity surface 77*a* of the mold 77 can be further increased. Thus, it is possible to more reliably prevent the expandable resin material from entering into the engaging element forming region.

On the other hand, when the expandable resin material flowing in the cavity tries to enter into a region (engaging element forming region) between the left and right barriers 20 from the end portions in the front-back direction of the molding hook and loop fastener 1, for example, the expandable resin material may be able to enter into the region where the lateral wall portion 50 and the engaging element 30 are first disposed, from the front end portion or the rear end portion of the molding hook and loop fastener 1. However, at the position where the lateral wall portion 50 and the engaging element 30 are disposed, since the lateral wall portion 50 and the engaging element 30 are formed between the left and right barriers 20 in a state of being adhered to the cavity surface 77*a* of the mold 77, it is possible to prevent the expandable resin material from entering into the engaging element forming region by flowing over the lateral wall portion 50 and the engaging element 30.

After that, the expandable resin material is spread into the cavity of the mold 77 and is expanded and solidified, and the expansion molding ends, whereby the cushion body 79 in which the molding hook and loop fastener 1 is integrally molded to necessary portions can be obtained. In the cushion body 79 obtained in this manner, since the foam body does not enter into the engaging element forming region of the molding hook and loop fastener 1 which is integrally molded to the surface, it is possible to stably secure the fastening strength of the engaging elements 30.

Thus, when the skin material is covered on the surface of the obtained cushion body 79 and the skin material is pressed toward the mounting positions of the molding hook and loop fastener 1 on the cushion body 79, the female engaging elements 30 on the rear surface of the skin material can be reliably engaged with the engaging elements 30 (male engaging elements) of the molding hook and loop fastener 1. In this manner, it is possible to accurately adhere the skin material along the curved surface of the cushion body 79 while preventing the skin material from floating from the cushion body 79.

In the molding hook and loop fastener 1 according to the first embodiment described above, the lateral wall portion 50 that is disposed between the second row of vertical wall arrays 21*b* and the engaging element 30 and between the engaging elements 30 that are adjacent in the width direction is erected on the substrate 10 in an approximately cubic form. The dimension in the length direction and the width direction of each lateral wall portion 50 is constant from the lower end portion (the end portion close to the substrate 10) to the upper end portion. However, in the invention, the shape of the lateral wall portion 50 is not particularly limited, and an upper surface portion that protrudes in the length direction and the width direction may be provided to the upper end portion of the lateral wall portion 50 same as the vertical wall 24 that includes the upper surface portion 26, for example. In this way, it is possible to increase an adhesion area between the lateral wall portion 50 of the molding hook and loop fastener 1 and the cavity surface 77*a* of the mold 77 and to further improve the adhesion properties of the molding hook and loop fastener 1.

Second Embodiment

Figure 13:
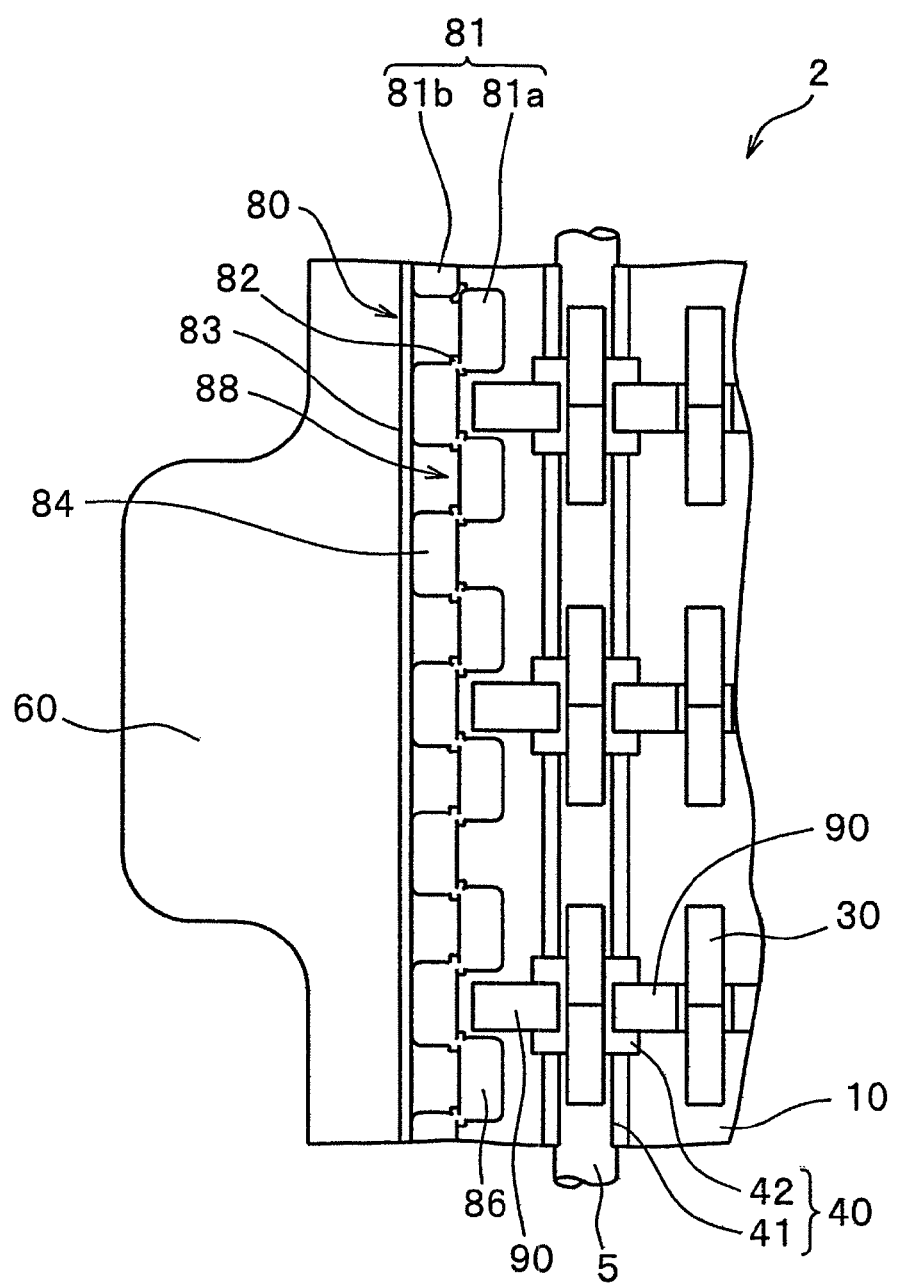
FIG. 13 is an enlarged view showing a portion of a molding hook and loop fastener according to a second embodiment of the invention at an enlarged scale.

FIG. 13 is an enlarged view illustrating a portion of a molding hook and loop fastener according to a second embodiment at an enlarged scale.

A molding hook and loop fastener 2 according to the second embodiment has basically the same configuration as the molding hook and loop fastener 1 according to the first embodiment described above, except that the shape of left and right barriers 80 and a lateral wall portion 90 are different. Thus, members and portions of the second embodiment having the same configurations as those of the first embodiment described above will be denoted by the same reference numerals, and description of such reference numerals will not be provided.

The molding hook and loop fastener 2 according to the second embodiment includes a planar substrate 10, barriers 80 provided on the upper surfaces of the left and right side edges of the substrate 10, a plurality of engaging elements 30 disposed between the left and right barriers 80, a magnetic body holding portion 40 disposed in the inner side of the barriers 80, a lateral wall portion 90 disposed along the width direction, and a flange portion 60 provided to extend outward in the width direction from the left and right side edges of the substrate 10. Further, a linear magnetic body 5 is molded integrally with the molding hook and loop fastener 2 in a state where the linear magnetic body 5 is held by a magnetic body holding portion 40 along the length direction.

In the second embodiment, each of the left and right barriers 80 includes two rows of vertical wall arrays 81 disposed along the length direction, a connecting part 82 that connects the vertical wall arrays 81 disposed on the adjacent rows, and a reinforcing portion 83 disposed on an outer wall surface side of the second row of vertical wall array 81b that is disposed on the outer side.

In the second embodiment, the vertical wall array 81 of each row includes a plurality of vertical walls 84 that is disposed intermittently at a predetermined mounting pitch in the length direction, and a gap 88 is provided between two vertical walls 84 that are adjacent in the length direction. In this case, the mounting pitch of the vertical walls 84 disposed in the vertical wall array 81 of each row is set to ½ of the mounting pitch in the length direction of the engaging elements 30. Moreover, the vertical walls 84 are disposed in a staggered form so that the vertical walls 84 are alternately arranged between the first and second rows of vertical wall arrays 81a and 81b. In particular, between the first row of vertical wall arrays 81a and the second row of vertical wall arrays 81b, the vertical walls 84 are alternately disposed in the length direction at a mounting pitch of ½ of the mounting pitch of the vertical wall arrays.

Further, each vertical wall 84 includes a post portion 85 erected from the substrate 10 and an upper surface portion 86 disposed at an upper end of the post portion 85 so as to be formed to protrude in the length direction and the width direction. A height dimension of the vertical wall 84 from the substrate 10 is set to be the same as the height dimension of the engaging element 30 from the substrate 10. In this case, in the barrier 80 of the second embodiment, the sum of areas of the upper surfaces of all of the vertical walls 84 disposed within the arrangement region of the barrier 80 is set to be 39% or more and 95% or less in relation to the barrier arrangement area represented by the product between the dimension α and the dimension β same as the first embodiment described above.

The connecting part 82 that connects the vertical wall arrays 81 of the adjacent rows is disposed so that the front end portion of the vertical wall 84 disposed in the vertical wall array 81 of each row and the rear end portion of the vertical wall 84 disposed in the vertical wall array 81 of a row that is adjacent to the row are connected at the closest position. In this case, the height dimension of each connecting part 82 from the substrate 10 is set to be the same as the height dimension of the vertical wall 84 from the substrate 10.

The lateral wall portion 90 of the second embodiment is disposed along the width direction between the second row of vertical wall arrays 81b of the barrier 80 and the engaging element 30 and the engaging elements 30 that are adjacent in the width direction. Further, the respective lateral wall portions 90 are connected to the engaging elements 30 at the lower end portions, and the lateral wall portions 90 and the engaging elements 30 are reinforcing each other.

Further, the lateral wall portion 90 of the second embodiment includes a post portion 91 erected from the substrate 10 and an upper surface portion 92 disposed at the upper end of the post portion 91 so as to be formed to protrude in the length direction and the width direction. The height dimension of each lateral wall portion 90 from the substrate 10 is set to be the same as the height dimension of the vertical wall 84 from the substrate 10 and the height dimension of the engaging element 30 from the substrate 10.

In this case, the post portion 91 of each lateral wall portion 90 has an approximately cubic form. Moreover, the upper surface portion 92 of each lateral wall portion 90 is formed to protrude in the length direction and the width direction from the upper end of the post portion 91, and the upper surface of the upper surface portion 92 is flat. Since each lateral wall portion 90 has such an upper surface portion 92, it is possible to further improve the adhesion properties of the molding hook and loop fastener 2 when the molding hook and loop fastener 2 is adhered to the cavity surface 77a of the mold 77.

The molding hook and loop fastener 2 according to the second embodiment can be manufactured using the manufacturing apparatus 70 illustrated in FIG. 6 same as the first embodiment described above. However, in this case, the shape of the molding cavity formed on the circumferential surface of the die wheel 71 is different from that of the first embodiment described above.

Thus, in manufacturing the molding hook and loop fastener 2 of the second embodiment, a molten resin material is continuously extruded toward the circumferential surface of the die wheel 71 from the continuous extrusion nozzle 72, and the resin material is cooled and solidified on the circumferential surface of the die wheel 71. After that, the molding hook and loop fastener 2 can be torn off from the circumferential surface of the die wheel 71 by the pickup roll 73.

Figure 14:
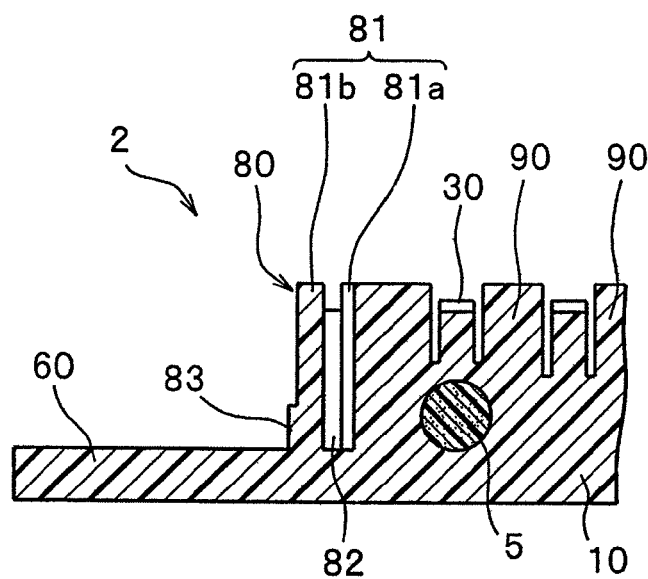
FIG. 14 is a cross-sectional view of the molding hook and loop fastener, showing a state before upper surface portions of a vertical wall and a lateral wall portion are formed.

In this case, as illustrated in FIG. 14, the molding hook and loop fastener 2 torn off by the pickup roll 73 is molded in a state where the upper surface portions 86 and 92 are not formed on the vertical wall 84 and the lateral wall portion 90, and the height dimension of the vertical wall 84 and the lateral wall portion 90 is larger than the height dimension of the connecting part 82 and the engaging element 30.

Figure 15:
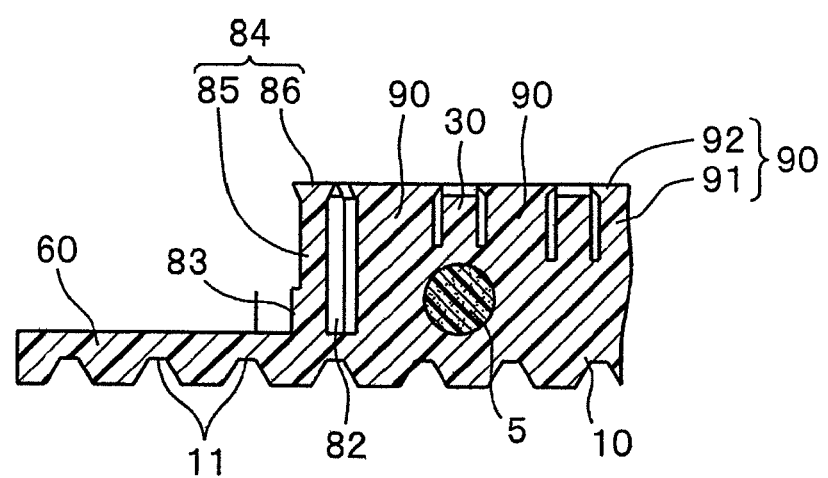
FIG. 15 is a cross-sectional view of the molding hook and loop fastener, showing a state where the upper surface portions of the vertical wall and the lateral wall portion are formed.

Subsequently, the molding hook and loop fastener 2 torn off from the circumferential surface of the die wheel 71 by the pickup roll 73 is introduced between the upper and lower press rolls 74 and 75, and the upper end portions of the vertical wall 84 and the lateral wall portion 90 are pressed by the upper press roll 74. As a result, as illustrated in FIG. 15, the upper end portions of the vertical wall 84 and the lateral wall portion 90 are broadened in the length direction and the width direction of the molding hook and loop fastener 2, whereby flat upper surface portions 86 and 92 are molded on the vertical wall 84 and the lateral wall portion 90. Moreover, the height dimension of the vertical wall 84 and the lateral wall portion 90 is adjusted to be the same as the height dimension of the connecting part 82 and the engaging element 30. Further, the molding hook and loop fastener 2 is pressed by the lower press roll 75, whereby the recess portion 11 is formed along the length direction of the molding hook and loop fastener 2 on the lower surface side of the substrate 10 and the flange portion 60.

After that, the molding hook and loop fastener 2 having passed through the space between the upper and lower press rolls 74 and 75 is subjected to such processing that the left and right flange portions 60 having a strip shape are partially cut, whereby the molding hook and loop fastener 2 of the second embodiment having a shape as illustrated in FIG. 13 is obtained.

In the molding hook and loop fastener 2 of the second embodiment obtained in this manner, since the number of rows of the vertical wall arrays 81 disposed in the barrier 80 is smaller than that of the molding hook and loop fastener 2 of the first embodiment described above, the flexibility is more favorable. Further, since the two rows of vertical wall arrays 81 disposed on the left and right barriers 80 are connected by the connecting part 82 having the same height dimension as the vertical wall 84, it is possible to reliably prevent the expandable resin material from entering the engaging element forming region by flowing over the barrier 80 when a cushion body is expansion-molded, for example. Thus, the molding hook and loop fastener 2 that is integrally molded to the expansion-molded cushion body can stably secure the inherent fastening strength of the engaging elements 30.

DESCRIPTION OF REFERENCE NUMERALS

1: MOLDING HOOK AND LOOP FASTENER
2: MOLDING HOOK AND LOOP FASTENER
5: LINEAR MAGNETIC BODY
10: SUBSTRATE
11: RECESS PORTION
20: BARRIER
21: VERTICAL WALL ARRAY
21*a*: FIRST ROW OF VERTICAL WALL ARRAYS
21*b*: SECOND ROW OF VERTICAL WALL ARRAYS
21*c*: THIRD ROW OF VERTICAL WALL ARRAYS
22: CONNECTING PART
23: REINFORCING PORTION
24: VERTICAL WALL
25: POST PORTION
26: UPPER SURFACE PORTION
27: BOUNDARY PORTION
28: GAP
30: ENGAGING ELEMENT
31: RISING PORTION
32: ENGAGING HEAD
40: MAGNETIC BODY HOLDING PORTION
41: FIRST HOLDING PORTION
42: SECOND HOLDING PORTION
50: LATERAL WALL PORTION
60: FLANGE PORTION
70: MANUFACTURING APPARATUS
71: DIE WHEEL
71*a*: MOLDING CAVITY
72: CONTINUOUS EXTRUSION NOZZLE
73: PICKUP ROLL
74: UPPER PRESS ROLL
75: LOWER PRESS ROLL
77: MOLD
77*a*: CAVITY SURFACE
78: MAGNET
79: CUSHION BODY (FOAM BODY)
80: BARRIER
81: VERTICAL WALL ARRAY
81*a*: FIRST ROW OF VERTICAL WALL ARRAYS
81*b*: SECOND ROW OF VERTICAL WALL ARRAYS
82: CONNECTING PART
83: REINFORCING PORTION
84: VERTICAL WALL
85: POST PORTION
86: UPPER SURFACE PORTION
88: GAP
90: LATERAL WALL PORTION
91: POST PORTION
92: UPPER SURFACE PORTION

The invention claimed is:

1. A method for manufacturing a molding hook and loop fastener which is molded integrally with a foam body at the same time as molding of the foam body, including:
   a planar substrate made from a thermoplastic resin including a first surface and a second surface opposite to the first surface;
   barriers erected on the first surface near left and right side edges along a length direction of the substrate; and
   a plurality of engaging elements disposed between the left and right barriers,
   wherein:
   a molten resin is poured toward a die wheel in which molding cavities are provided on a circumferential surface for molding at least the barriers and the engaging elements to form the substrate as well as the barriers and the engaging element on the circumferential surface of the die wheel,
   the molded hook and loop fastener having the molded substrate, barriers and engaging elements is teared off from the circumferential surface of the die wheel, and
   upper end portions of the respective barriers of the teared molded fastener are pressed with a press roll to form upper surface portions in which upper surfaces are flat and which are provided at a position on the molded hook and loop fastener farthest from the first surface of the substrate in a height direction and can be adhered to a cavity surface of a mold.

2. The method for manufacturing a molding hook and loop fastener according to claim 1, wherein the press roll is heated.

3. The method for manufacturing a molding hook and loop fastener according to claim 1 wherein when the molding hook and loop fastener is molded on the circumferential surface of the die wheel, a height dimension of the barrier is larger than a height dimension of the engaging element.

4. The method for manufacturing a molding hook and loop fastener according to claim 3, wherein a height dimension of the upper surface portion of the barrier which is pressed with the press roll from the substrate is the same as a height dimension of the engaging element from the substrate.

5. The method for manufacturing a molding hook and loop fastener according to claim 4, wherein each of the barriers has at least two rows of vertical wall arrays.

6. The method for manufacturing a molding hook and loop fastener according to claim 5, wherein the vertical wall array of each row includes a plurality of vertical walls that are disposed intermittently in the length direction and are alternately disposed between adjacent vertical wall arrays.

7. The method for manufacturing a molding hook and loop fastener according to claim 6, wherein the upper surface portion is formed so as to protrude at least in a width direction of the substrate more than an upper end of a post portion erected from the substrate in each vertical wall.

8. The method for manufacturing a molding hook and loop fastener according to claim 6, wherein the upper surface portion is formed so as to protrude in a length direction and a width direction of the substrate more than an upper end of a post portion erected from the substrate in each vertical wall.

9. The method for manufacturing a molding hook and loop fastener according to claim 6, wherein the sum of areas of upper surfaces of all of the vertical walls included in the barriers is set to be from 39% to 95% in relation to a barrier arrangement area that is calculated by the product between a dimension in the length direction of the barrier and a dimension in a width direction from an inner wall surface of the vertical wall array of the barrier, disposed closest to the engaging element to an outer wall surface of the vertical wall array disposed on an outermost side.

10. The method for manufacturing a molding hook and loop fastener according to claim 1, wherein molding cavities are provided on the circumferential surface of the die wheel for molding lateral wall portions disposed along a width direction on the inside of the barrier in the molded hook and loop fastener, and the lateral wall portions are molded when the substrate is molded, and the upper end portions of the lateral wall portions of the molded hook and loop fastener which is teared off from the circumferential surface of the die wheel are pressed with a roll press to form flat upper surface portions on the lateral wall portions.

11. The method for manufacturing a molding hook and loop fastener according to claim 10, wherein the engaging elements are disposed at a predetermined pitch in a width direction of the substrate, lateral wall portions are disposed between the barrier and the engaging elements and between the engaging elements that are adjacent in the width direction, and upper surfaces of the upper surface portions of the barriers are disposed on the same plane as upper surfaces of the lateral wall portion.

12. A method for manufacturing a molding hook and loop fastener which is molded integrally with a foam body at the same time as molding of the foam body, including:

a planar substrate made from a thermoplastic resin including a first surface and a second surface opposite to the first surface;

barriers erected on the first surface near left and right side edges along a length direction of the substrate;

a plurality of engaging elements disposed between the left and right barriers; and lateral wall portions disposed along a width direction on the inside of the barriers, wherein:

a molten resin is poured toward a die wheel in which molding cavities are provided on the circumferential surface for molding at least the lateral wall portions and the engaging elements to form the substrate as well as the lateral wall portions and the engaging elements on the circumferential surface of the die wheel, the molded hook and loop fastener having the molded substrate, lateral wall portions and engaging elements is teared off from the circumferential surface of the die wheel, and upper end portions of the lateral wall portions of the molded hook and loop fastener which is teared off are pressed with a press roll to form upper surface portion on the lateral wall portions in which upper surfaces are flat and which are provided at a position on the molded hook and loop fastener farthest from the first surface of the substrate in a height direction and can be adhered to a cavity surface of a mold.

13. The method for manufacturing a molding hook and loop fastener according to claim 12, wherein the press roll is heated.

14. The method for manufacturing a molding hook and loop fastener according to claim 12 wherein when the molding hook and loop fastener is molded on the circumferential surface of the die wheel, a height dimension of the lateral wall portions is larger than a height dimension of the engaging element.

15. The method for manufacturing a molding hook and loop fastener according to claim 14, wherein a height dimension of the upper surface portion of the lateral wall portions which is pressed with the press roll from the substrate is the same as a height dimension of the engaging element from the substrate.

16. The method for manufacturing a molding hook and loop fastener according to claim 12, wherein molding cavities are provided on the circumferential surface of the die wheel for molding the barriers in the molded hook and loop fastener to integrally mold the barriers and a plurality of the engaging elements on the substrate; and upper end portions of the barriers in the molded hook and loop fastener which is teared off from the circumferential surface of the die wheel are pressed with a press roll to form flat upper surface portions on the barriers.

17. The method for manufacturing a molding hook and loop fastener according to claim 16, wherein the engaging elements are disposed at a predetermined pitch in a width direction of the substrate, the lateral wall portions are disposed between the barriers and the engaging elements and between the engaging elements that are adjacent in the width direction, and upper surfaces of the barriers are disposed on the same plane as upper surfaces of the lateral wall portions.

* * * * *

UNITED STATES PATENT AND TRADEMARK OFFICE
CERTIFICATE OF CORRECTION

PATENT NO.       : 10,016,023 B2
APPLICATION NO.  : 14/878248
DATED            : July 10, 2018
INVENTOR(S)      : Mineto Terada et al.

Page 1 of 1

It is certified that error appears in the above-identified patent and that said Letters Patent is hereby corrected as shown below:

In the Specification

In Column 9, Line 63, after "Line" insert -- III-III --.

Signed and Sealed this
Twenty-first Day of August, 2018

Andrei Iancu
*Director of the United States Patent and Trademark Office*